US009524311B2

(12) United States Patent
Meng

(10) Patent No.: US 9,524,311 B2
(45) Date of Patent: *Dec. 20, 2016

(54) SYSTEMS AND METHODS INVOLVING A MULTI-PASS ALGORITHM FOR HIGH CARDINALITY DATA

(71) Applicant: SAS Institute Inc., Cary, NC (US)

(72) Inventor: Gang Meng, Cary, NC (US)

(73) Assignee: SAS Institute Inc., Cary, NC (US)

( * ) Notice: Subject to any disclaimer, the term of this patent is extended or adjusted under 35 U.S.C. 154(b) by 372 days.

This patent is subject to a terminal disclaimer.

(21) Appl. No.: 14/322,737

(22) Filed: Jul. 2, 2014

(65) Prior Publication Data

US 2014/0330839 A1 Nov. 6, 2014

Related U.S. Application Data

(63) Continuation of application No. 14/270,308, filed on May 5, 2014.
(Continued)

(51) Int. Cl.
G06F 9/50 (2006.01)
G06F 17/30 (2006.01)
(Continued)

(52) U.S. Cl.
CPC .............. G06F 17/3033 (2013.01); G06F 9/50 (2013.01); G06F 9/5072 (2013.01); H04L 67/10 (2013.01);
(Continued)

(58) Field of Classification Search
CPC .... H04L 29/08144; G06F 9/50; G06F 9/5016; G06F 9/5072; G06F 17/18
See application file for complete search history.

(56) References Cited

U.S. PATENT DOCUMENTS 8,918,410 B2 * 12/2014 Guirguis ................ G06Q 10/06
707/758
2004/0098390 A1 * 5/2004 Bayliss ............. G06F 17/30575
(Continued)

OTHER PUBLICATIONS

Microsoft LINQ to HPC http://msdn.microsoft.com/en-us/library/hh378121 retrieved on May 7, 2014, 8 pages.
(Continued)

Primary Examiner — Jeong S Park
(74) Attorney, Agent, or Firm — Kilpatrick Townsend & Stockton LLP

(57) ABSTRACT

This disclosure describes methods, systems, computer-readable media, and apparatuses for calculating a summary statistic. Calculating the summary statistic can be performed by identifying multiple subsets of a set of variable observations and assigning the subsets to grid-computing devices such that no two of the subsets are assigned to a same one of the grid-computing devices. A parallel processing operation that involves multiple processing phases at each of the grid-computing devices is then coordinated. The parallel processing operation includes each of the grid-computing devices inventorying the respectively assigned subset and generating inventory information representative of the respectively assigned subset. Subsequently, the inventory information generated by the grid-computing devices is received, and a summary statistic is determined by synthesizing the received inventory information.

36 Claims, 20 Drawing Sheets

Related U.S. Application Data

(60) Provisional application No. 61/819,968, filed on May 6, 2013.

(51) Int. Cl.
  *G06F 17/18* (2006.01)
  *H04L 29/08* (2006.01)

(52) U.S. Cl.
  CPC ......... *G06F 17/18* (2013.01); *H04L 29/08144* (2013.01)

(56) References Cited

U.S. PATENT DOCUMENTS

| | | | | |
|---|---|---|---|---|
| 2006/0020767 A1* | 1/2006 | Sauermann | ............ | G06F 9/5066 712/1 |
| 2009/0193427 A1* | 7/2009 | Pu | ......................... | G06F 9/5072 718/104 |
| 2010/0235606 A1* | 9/2010 | Oreland | ............ | G06F 17/30336 711/173 |
| 2010/0262871 A1* | 10/2010 | William | ................ | G06F 15/173 714/48 |
| 2011/0057937 A1* | 3/2011 | Wu | ..................... | G06F 15/8023 345/505 |
| 2013/0212340 A1* | 8/2013 | Berg | ................. | G06F 17/30575 711/154 |
| 2014/0330884 A1* | 11/2014 | Meng | ..................... | H04L 67/10 709/201 |

OTHER PUBLICATIONS

SAS/STAT® 13.1 User's Guide, Chapter 102 The TREE Procedure http://support.sas.com/documentation/onlinedoc/stat/131/statug.pdf retrieved on May 7, 2014, pp. 8822-8856.

\* cited by examiner

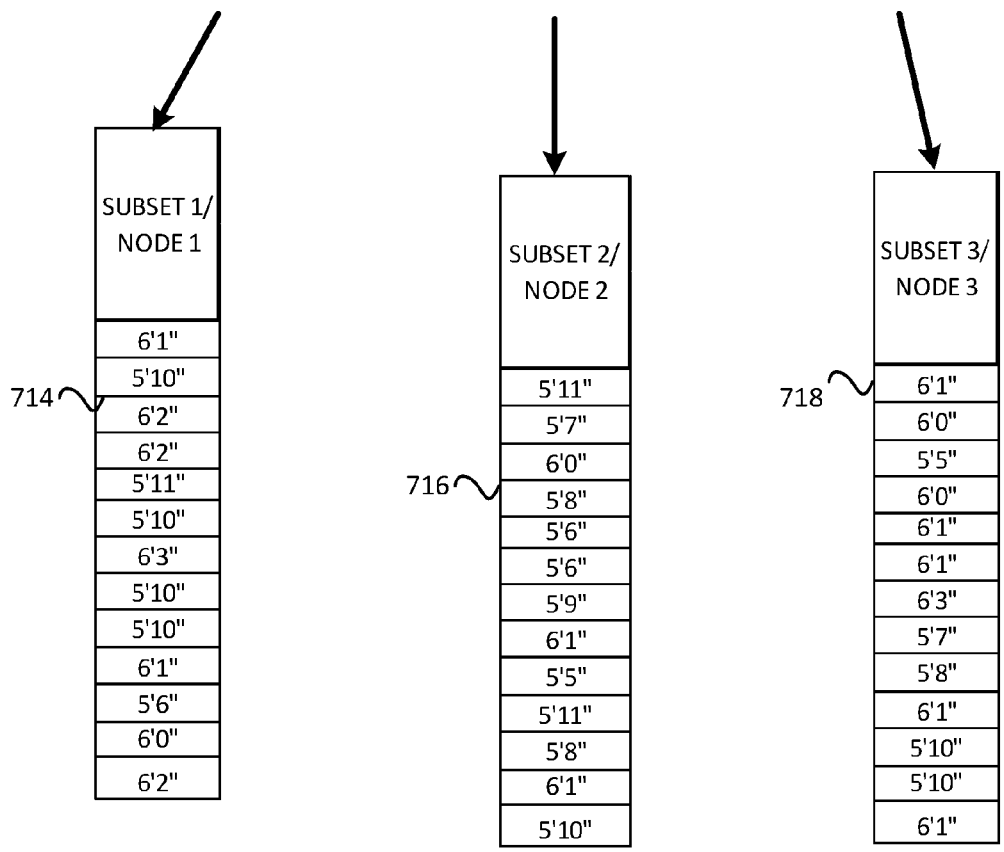

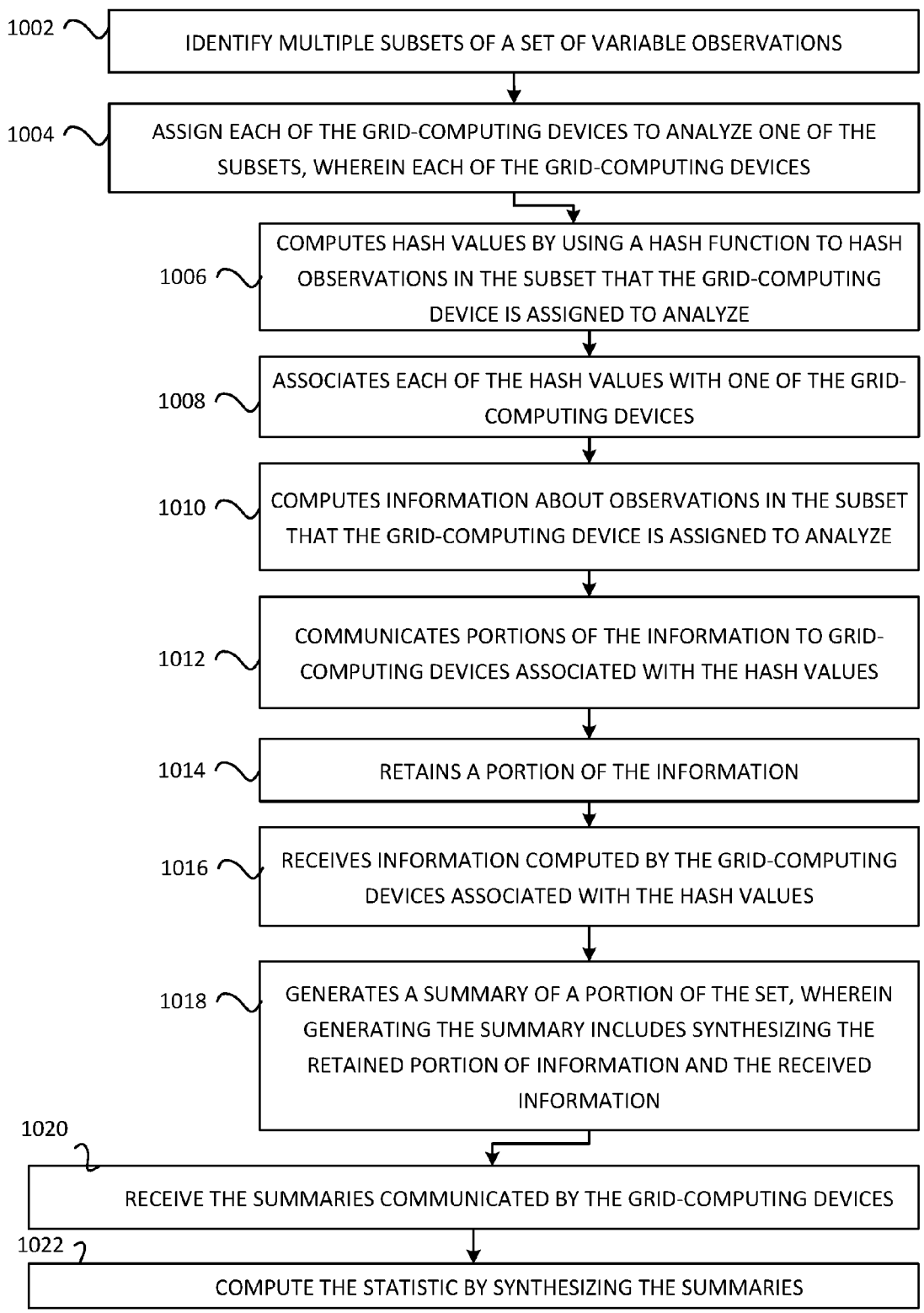

SYSTEMS AND METHODS INVOLVING A MULTI-PASS ALGORITHM FOR HIGH CARDINALITY DATA

This application is a continuation of U.S. application Ser. No. 14/270,308, which was filed on May 5, 2014, and which is entitled "Systems and Methods Involving a Multi-Pass Algorithm For High Cardinality Data,". U.S. application Ser. No. 14/270,308 is a non-provisional of and claims the benefit and priority under 35 U.S.C. §119(e) of U.S. Provisional Application No. 61/819,968, filed on May 6, 2013, and entitled "Systems and Methods Involving a Multi-Pass Algorithm For High Cardinality Data,". Both U.S. application Ser. No. 14/270,308 and U.S. Provisional Application No. 61/819,968 are hereby incorporated by reference for all purposes.

TECHNICAL FIELD

Aspects of the disclosure generally relate to the efficient calculation of summary statistics within large sets of data characterized by high cardinality.

BACKGROUND

In statistical computing and data science, large data sets characterized by high cardinality are increasingly being analyzed. There are a wide variety of metrics, statistics, and summaries that are frequently used to analyze and study various phenomena represented by large sets of data. Additionally operations such as sorting, clustering, record-matching, filtering and merging are increasingly being performed with regards to large data sets. Both standalone computing devices and parallel computing systems have and will continue to be used to process the data in large data sets.

BRIEF SUMMARY

This disclosure also describes a method that comprises identifying multiple subsets of a set of variable observations, assigning the subsets to grid-computing devices such that no two of the subsets are assigned to a same one of the grid-computing devices, coordinating a parallel processing operation involving multiple processing phases at each of the grid-computing devices, the parallel processing operation including each of the grid-computing devices inventorying the respectively assigned subset and generating inventory information representative of the respectively assigned subset, receiving the inventory information generated by the grid-computing devices, and determining a summary statistic by synthesizing the received inventory information at the computing device, the summary statistic representative of the set of variable observations.

Also, this disclosure describes an apparatus that comprises a process configured to perform operations that include identifying multiple subsets of a set of variable observations, assigning the subsets to grid-computing devices such that no two of the subsets are assigned to a same one of the grid-computing devices, coordinating a parallel processing operation involving multiple processing phases at each of the grid-computing devices, the parallel processing operation including each of the grid-computing devices inventorying the respectively assigned subset and generating inventory information representative of the respectively assigned subset, receiving the inventory information generated by the grid-computing devices, and determining a summary statistic by synthesizing the received inventory information at the computing device, the summary statistic representative of the set of variable observations.

Additionally, this disclosure describes a computer-program product tangibly embodied in a non-transitory machine-readable storage medium. The storage medium has instructions stored thereon, and the instructions are operable to cause a data processing apparatus to perform operations including identifying multiple subsets of a set of variable observations, assigning the subsets to grid-computing devices such that no two of the subsets are assigned to a same one of the grid-computing devices, coordinating a parallel processing operation involving multiple processing phases at each of the grid-computing devices, the parallel processing operation including each of the grid-computing devices inventorying the respectively assigned subset and generating inventory information representative of the respectively assigned subset, receiving the inventory information generated by the grid-computing devices, and determining a summary statistic by synthesizing the received inventory information at the computing device, the summary statistic representative of the set of variable observations.

BRIEF DESCRIPTION OF THE DRAWINGS

Aspects of the disclosure are illustrated by way of example. In the accompanying figures, like reference numbers indicate similar elements, and:

FIGS. 8A-8F are depictions of example sequences of operations and procedures in which certain of the techniques disclosed herein are applied in calculating a top-k statistic for a specific data set.

FIG. 11 is a flowchart that presents an additional example of a sequence of operations for computing a summary statistic.

DETAILED DESCRIPTION

Figure 1:
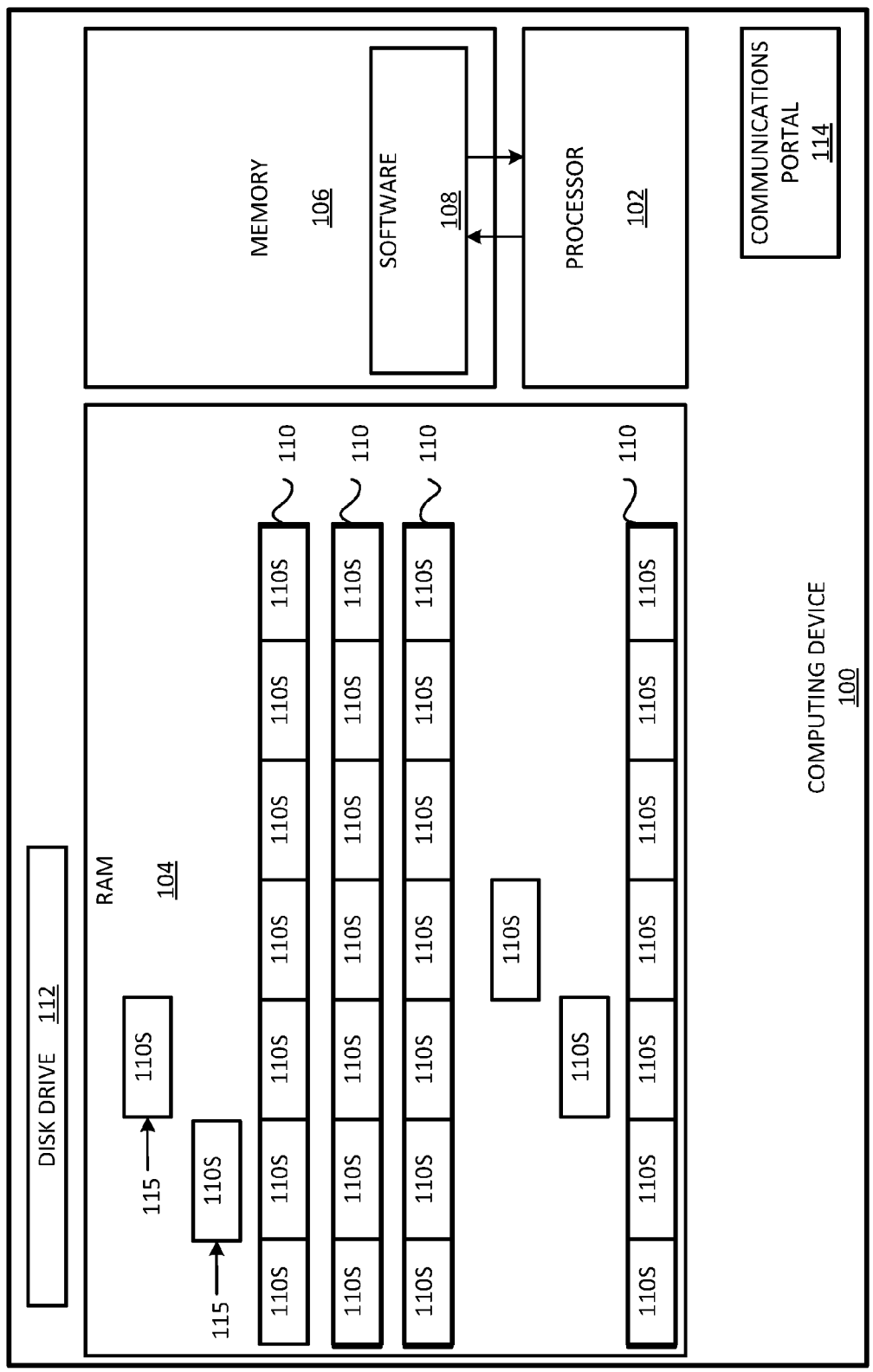
FIG. 1 is a block diagram showing an example of a computing device configured to perform operations and techniques described in this disclosure.

In analyzing very large data sets, it is frequently desirable to calculate statistics that summarize or characterize the data in the set. Calculating accurate summary statistics for a large data set may often require not only that every data point to be processed, but also may require significant amounts of memory for storing the results of intermediate computations, sorted subsets and other elements and structures used during the process. In many cases, when common algorithms are used to compute summary statistics, the amount of processing and intermediate storage may change, for example, exponentially as a function of the size and cardinality of the data set.

One example of such a summary statistic is a "top-k" measure. The top-k statistic identifies the k elements (or variable observations) that are most frequent within a data set. For example, when applied to the following data set:
    {0, 1, 1, 1, 5, 1, 5, 2, 3, 4, 6, 5, 6, 5, 6}
the top-k statistic, with k=3, is the subset {1, 5, 6}. With k=2, the top-k statistic is the subset {1, 5}. Frequently, in situations in which a top-k statistic is calculated for a data set, it is also desirable to know the number of instances of each top-k element. For example, when the top-k statistic is determined for the data set provided above, and k=2, it may be useful to know that 1 is found four times in the data set, while 5 is found three times.

This disclosure describes a computing system capable of efficiently using memory while computing summary statistics for large data sets. The system can be either a single processing apparatus with capabilities for performing in-memory processing, or a distributed computing system that involves multiple computing devices, each configured to perform in-memory processing.

When calculating summary statistics for a data set, the system can implement a divide-and-conquer processing method that makes efficient use of memory by dividing the overall processing into several phases and analyzing different portions of the data in each phase. The method can involve updating intermediate results at the end of each phase, as well as erasing previously-stored results from memory when such results are rendered irrelevant by the results in a later phase. This manner of processing can be facilitated by the system assigning each data set element to a processing phase in a manner that ensures that all identical elements (repeated instances of a same variable observations) are assigned to a same processing phase.

Each data set element can be assigned to a processing phase based on a hash function that includes a modular operation. The results of the modular operations indicate the phase assignments of the data set elements. After assigning data set elements in this way, the system processes data set elements in phases, using in-memory processing. During each processing phase, the system processes the data set elements assigned to the current phase, and does not process other data set elements. As a result of processing in this way, the system may avoid substantial amounts of intermediate data storage.

Also, during the execution of the processing phases, much of the stored intermediate data may quickly become irrelevant as a result of the manner in which data set elements are assigned to processing phases. Thus, the processing system may erase large amounts of intermediate information from memory more rapidly than when other approaches are used. The system can achieve savings in memory, for example, when summary statistics are calculated on data sets characterized by high cardinality.

When computing summary statistics for large data sets, a parallelized grid-computing system may also operate using the same techniques described above. By using a grid-computing system, the data may be further partitioned, thereby facilitating additional speedup. A grid-computing system may include several computing devices operated in a coordinated manner. In the grid-computing environment, the computing devices are connected together in a network that enables each processor to share information with any number of other processors on the grid. Hereinafter, such processors are referred to as "grid-computing devices."

In this process, a unique portion of a data set can be assigned to each grid-computing device, and each grid-computing device analyzes the data that has been assigned to it. In performing this analysis, each grid-computing device implements the processing operations described above with regards to a standalone computing device, while also implementing a system of coordinated information sharing to efficiently synthesize results that are relevant to the data set in the aggregate. Thus, identical data elements are processed within the same phase, although the identical data elements may not necessarily be processed by the same grid-computing device.

Several drawings will now be described to explain example techniques, designs, operations and features contemplated by this disclosure. While particular embodiments of the invention are described below, this disclosure should be understood as covering the many other alternative embodiments of the invention which will be recognizable or readily derivable, in view of the information provided herein. Where this disclosure provides specific details, examples, implementations or algorithms related to the subject matter at hand, each such specific description shall be understood as being provided for explanatory purposes only, and as such, indicates only one of the many embodiments of the invention which will be readily recognizable to people of ordinary skill in an art to which this disclosure is directed. Thus, no such specific description shall be construed as expressly or impliedly limiting, defining, or delineating the scope of the inventive subject matter presented herein.

FIG. 1 illustrates a computing device configured to efficiently use memory while computing summary statistics for large data sets characterized by high cardinality. The computing device 100 may operate in a conventional operating mode or a grid-computing mode. In the conventional operating mode, the computing device 100 stores entire data sets 110 and performs the processing to calculate summary statistics for any number of the data sets.

In the grid-computing mode, which will be explained in more detail with reference to FIG. 3, the computing device 100 is one of multiple similar computing devices in a grid-computing system. When a computing device 100 is operated in grid-computing mode, it may generally be referred to as a "grid-computing device," and referred to using the reference numeral "100G" in the drawings that follow FIG. 1. Where this disclosure specifies that a computing device is a grid-computing device 100G, the additional specificity should not be understood as implying anything other than a disposition of the device within a grid-computing system and the mode in which the device is operated.

In the grid-computing mode, the processing and data storage for computing summary statistics can be distributed and parallelized such that each grid-computing device 100G processes a portion of the data in a data set for which a summary statistic is calculated. Grid-computing devices 100G may store entire data sets 110, even though the distributed processing performed in the grid-computing mode obviates the need for entire data sets 110 to be stored at any one single grid-computing device 100G. As depicted at 115, a grid-computing device 100G may alternatively store the pertinent subset 110S of a data set 110 for which a summary statistic is calculated.

As depicted in FIG. 1, the computing device 100 includes a processor 102, random access memory 104 and memory 106. Memory 106 may be used to store software 108 executed by the processor 102.

The software 108 can be analytical, statistical, scientific, or business analysis software, or any other software with functionality for computing summary statistics with regards to large data sets. The software 108 includes instructions for performing data analysis and, when executed by the processor 102 under certain circumstances, causes the processor to calculate summary statistics with regards to data sets 110 or subsets 110S stored in the random access memory (RAM) 104.

The software 108 includes multiple hash functions, including one or more hash functions for each type of data. For example, the software 108 can include a hash function that maps floating point numbers to integer values, and a different hash function that maps strings to integer values. When performing processing used to calculate a summary statistic with regards to a data set 110 or subset 110S, the computing device 100 can use the hash functions to determine a processing phase assignment of each data element in the data set 110 or subset 110S, as the case may be. The hash functions may provide bijective or surjective mapping of data elements to numerical values.

When a computing device 100 processes data set 110 or subset 110S elements to compute a summary statistic, the computing device 100 hashes each element using the appropriate hash function for the element data type. The computing device stores each resulting hash value in RAM 104 in such a way that the hash value is indexed or linked to the hashed data element from which it was computed. Hash values may then be referenced to determine the processing-phase assignments of the hashed data elements that they are linked to.

Hash functions of various different types may be used to determine processing phase assignments. However, when hashing is used for processing phase assignments, the software 108 may operate and be designed to provide hash functions that map data set elements to integers in all cases. The hash function can be easily modifiable based on an operating parameter (n) that represents the number of processing phases used in calculating the summary statistic. The hash function may have exactly n equally probable integer hash values (1 . . . n) in its range.

One example of such a hash function is based on a first operation that converts every data set element to an integer. For example, in the case of decimal data set elements, a ceiling or floor can be used to perform this first operation. A next operation involves performing the modular operation in which the integer resulting from the first operation is the dividend, and n is the divisor. The remainder is then incremented by one, so that in all cases, the hash will be an integer in the set of integers $\{1 . . . n\}$. Another example hash function may incorporate the FNV-1a hash algorithm as a first operation, followed by the modular operation mentioned above.

Figure 2:
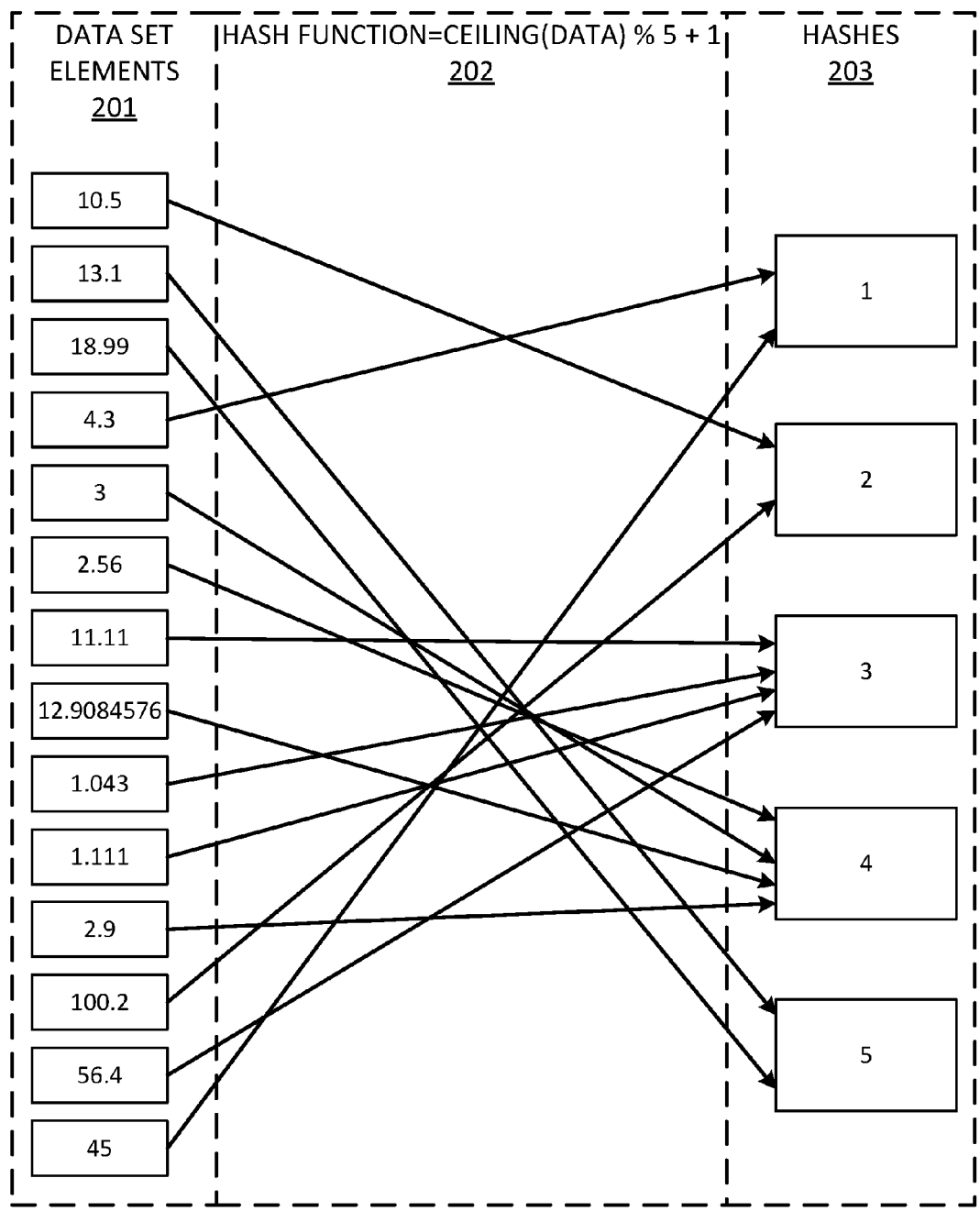
FIG. 2 is a depiction of an example of a use of a hash function to generate hash values for multiple numerical variable observations in a data set.

FIG. 2 illustrates an example of how such a hash function may be applied to decimal numbers in a data set, so that the decimal numbers may each be assigned to one of five processing phases. A data set that includes several values having different numbers of decimal places is shown at 201. At 202, each of the data set elements is depicted as being hashed by a hash function involving the three operations (conversion to integer, modular operation, increment by 1). At 203 the hashes generated by the hash function are shown. The hash function shown at 202 involves a mod 5 operation and addition by one. As such, all positive real numbers are in the hash function domain, and the range of the hash function is the set of integers $\{1, 2, 3, 4, 5\}$. Moreover, each value in the range is the hash of exactly one-fifth of the numbers in the set of positive real numbers. That is, the mapping of positive real numbers to hash values is evenly distributed across the set of positive real numbers in the domain of the hash function.

Because its range is the set of integers from 1-5, the hash function 202 can be used when 5 processing phases will be used to calculate a summary statistic that characterizes a data set, and each data set element may be assigned to be processed during the phase indicated by its hash value. For example, the real number 11.11 is one of the elements of data set 201. The arrows that connect data set elements 201 and hash values 203 in FIG. 2 show that 11.11 maps to a hash value of 3 when hash function 202 is applied. Under the phase assignment scheme mentioned above, 11.11 can be assigned to the third processing phase because it maps to 3.

The following explanation illustrate the operations involved in applying the hash function 202. At 201, a value of 10.5 is shown in the data set. When this particular value is hashed at 202, the resulting hash value is 2, as indicated by the line that connects the value 10.5 to the hash value of 2. The value of 2 results because the ceiling of 10.5 is 11. 11 mod 5 is 1, and 1 plus 1 is 2. Thus, 2 is the hash value obtained when the hash function 202 is used to hash the value 10.5. Similar operations and computations can be used in applying the hash function 202 to any of the data set elements 201.

Within a computing device 100, any number of data sets 110 or subsets 110S may be stored in RAM 104, and the data in each set 110 may be stored in accordance with any data storage format. The data sets 110 can include any type of data, including scientific or business data—whether gathered manually, automatically from sensors, or generated by commercial, internet, or communications activity. For example, a data set 110 may include information such as the credit card account numbers involved in transactions with a business during a given period of time. A data set 110 may contain numbers, strings, symbols, codes, or any other representation having informational value. Within any one data set 110 or subset 110S, multiple types of data and multiple data formats may be stored.

As shown in FIG. 1, the computing device 100 includes a disk drive 112 and network communications portal 114. The network communications portal 114 may include a receiver/transmitter assembly (not shown) that enables the computing device 100 to exchange information over a wired or wireless communications network, such as the internet, a local area network (LAN), or wireless local area network (WLAN). When a computing device 100 is operated in grid-computing mode, the device can use the network communications portal 114 to communicate with other grid-computing devices 100G.

The computing device 100 may update the data sets 110 stored in RAM 104 by downloading data from the Internet or accessing remote data bases or servers, and storing the data in RAM 104 following download. Similarly, the computing device 100 may access new or additional data sets 110 by reading data sets 110 from a medium inserted into the disk drive 112, and storing these data sets in RAM 104. Also, the computing system may supplement existing data sets 110 stored in RAM 104 by reading additional data from a medium in the disk drive 112 and using the data to supplement data sets already stored in RAM 104.

Figure 3:
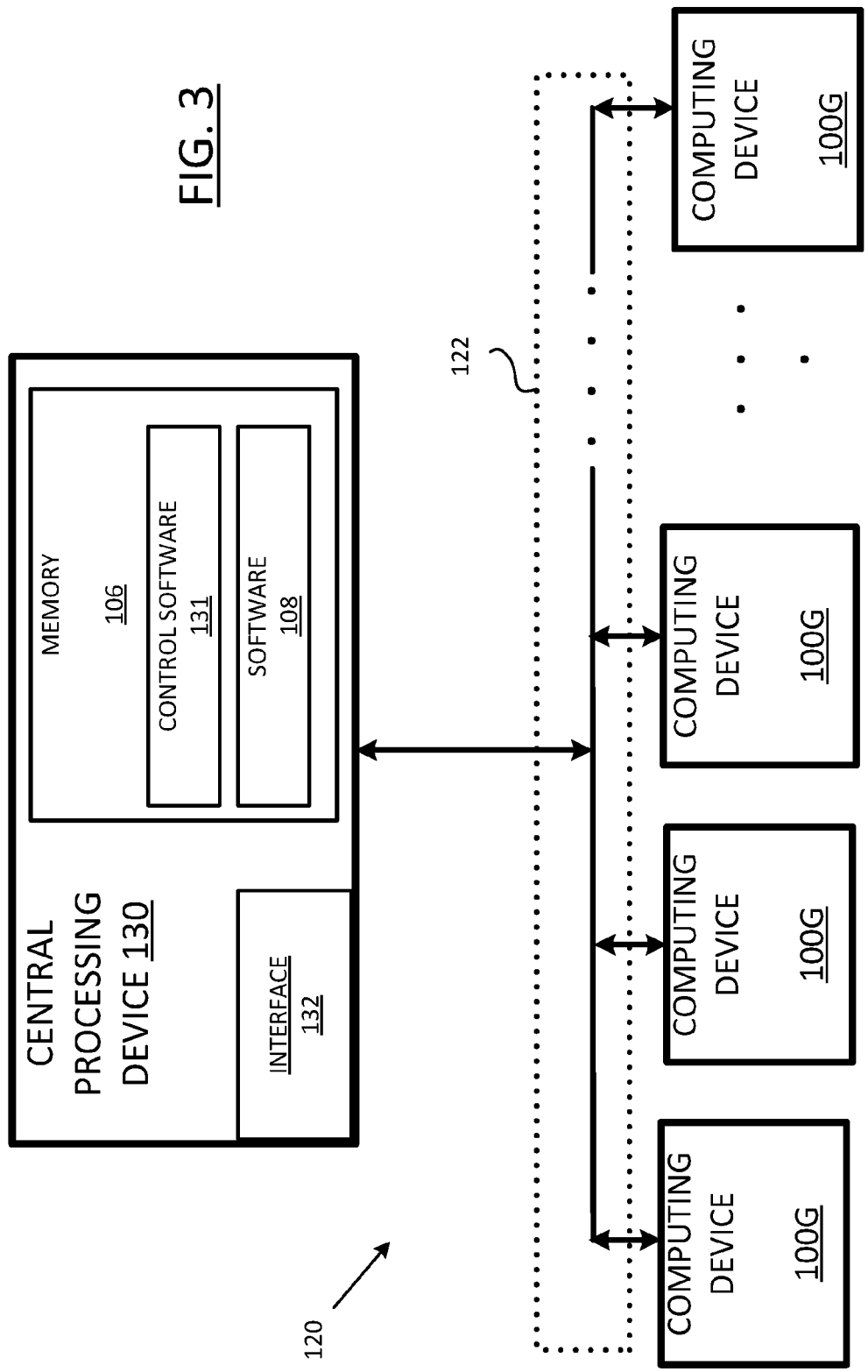
FIG. 3 is a block diagram that depicts an example of a grid-computing system configured to perform operations described in this disclosure.

FIG. 3 depicts an example grid-computing system 120 that includes multiple grid-computing devices 100G that are mutually linked, either directly or indirectly, by a data bus 122 (a wired or wireless communications network may be used in place of a data bus). The data bus 122 enables each grid-computing device 100G to share information with any number of other devices 100G in the grid-computing system 120.

Grid-computing devices 100G may be uniquely referenced by an identification address, such as an Internet Protocol (IP) number. Moreover, grid-computing devices 100G may store the identification addresses of other grid-computing devices 100G within memory 106. In this way, a grid-computing device 100G may use data bus 122 to selectively transmit or forward data to any other grid-computing device 100G.

In the grid-computing system 120, a central coordinator processing device 130 (hereinafter also referred to as a "central controller" for brevity) provides control and timing information that coordinates parallel processing operations performed at grid-computing devices 100G. The central controller 130 can be configured to selectively transmit or broadcast information to any of the grid-computing devices 100G using data bus 122, a wireless network connection, or any other type of suitable medium.

The grid-computing system 120 may be arranged so that the central controller 130 communicates directly with other grid-computing devices 100G in the system 120, or communicates with some of the grid-computing devices 100G by way of any number of relay stages in which one grid-computing device 100G forwards information to another device 100G.

The grid-computing system 120 may be used to calculate a variety of summary statistics with regards to data sets, and may apply various combinations of the processing and algorithmic techniques described herein to save memory and make calculation of the statistics faster. The techniques disclosed herein may be particularly relevant in the context of determining an average value, median value, mode or range of variable observations in a high-cardinality data set. The techniques are also applicable to computing top-k statistics, bottom-k statistics, distinct count statistics, as well as a number of other data set statistics, summaries, and representations. Although this disclosure is intended to cover all such applications of the disclosed techniques, this disclosure explains the techniques by way of several examples that are applied in the context of computing a top-k statistic.

When the grid-computing system 120 is used to calculate summary statistics for data sets 110, the central controller 130 can use its communications capabilities to distribute data to the grid-computing devices 100G, and communicate the beginning and end of processing phases. The central controller 130 can also use its communications capabilities to query the grid-computing devices 100G, receive status reports from the grid-computing devices 100G, and receive and aggregate information representing the results of processing performed by the grid-computing devices 100G.

For example, in one grid-computing system 120 operating mode, the grid-computing devices 100G report intermediate computational results following the completion of each processing phase. The results can be reported to the central controller 130, which further processes the results in combination with previously reported results, and stores a summary representing—in the aggregate—the data elements theretofore processed in the grid-computing system 120.

Alternatively, as explained in greater detail with reference to FIGS. 8A-8F, the various grid-computing devices 100G may collectively implement an indexed storage system whereby, at the end of each processing phase, intermediate results are communicated between grid-computing devices 100G based on an addressing system that dictates where particular results will be stored. In this way for this embodiment, no single computing device or storage location is used to store an aggregate summary of the data elements processed theretofore. Rather, the summary information is fragmented, and distributed for storage across the various grid-computing devices 100G. This framework has the potential to provide greater memory capacity, and storage flexibility, and can avoid communications delays and bottlenecks that otherwise might be occasioned by the communication of all intermediate results to the central controller 130.

The central controller 130 includes the various components, software, and interfaces described previously with regards to grid-computing devices 100G. Additionally, the central controller 130 may also include control software 131 that provides instructions related to controlling the operations of the grid-computing system 120, and an interface 132 through which users interact with and configure the grid-computing system 120. For example, the central controller 130 may include a display screen through which a user may select data sets 110 to be analyzed, specify a type of analysis to be performed on any data set or combination of data sets (e.g., clustering, sorting, grouping, averaging, top-k, and distinct count), and input analysis parameters, data display requirements, or other specifications.

The grid-computing system 120 and central controller interface 132 may provide a user with the option of selecting a data set 110 stored only in RAM 104 or memory 106 on the central controller 130, or a data set 110 that is already stored in RAM 104 by the grid-computing devices 100G. When a data set 110 that is not yet stored on the grid-computing devices 100G is selected for analysis that involves the computation of a summary statistic, the central controller 130 partitions the data set 110 into subsets 110S, such that the number of subsets 110S is equal to the number of grid-computing devices 100G that will be used to help calculate the summary statistic. The central controller 130 then distributes the subsets 110S among the grid-computing devices 100G such that each grid-computing device 100G receives a unique subset 110S. Each grid-computing device 100G stores the subset 110S that it receives in RAM 104 so that the grid-computing device 100G will later be able to perform in-memory processing of the data in the subset 100S.

Alternatively, when a data set 110 that is stored on the grid-computing devices 100G is selected for analysis that involves the computation of a summary statistic, the central controller 130 communicates data-set-partitioning instructions to the grid-computing devices 100G. The data-set-partitioning instructions effectively implement the partitioning of the data set 110 into subsets 110S, as described previously. In the process, the instructions provide each of the grid-computing devices 100G with an exclusive subset assignment. The instructions cause every data element in the selected data set 110 to be assigned to one of the assigned subsets 110S. At each grid-computing device 100G, the data processing is performed only on the data elements in the assigned data subset 110S.

The following table is provided to explain and define certain features that will be referred to hereinafter. The table represents a simplified data subset 110S stored at a grid-computing device 100G (in the context of a grid-computing system 120) or a data set 110 stored at a computing device 100 (in a standalone computing context).

TABLE 1

| DATA ELEMENTS | PHASE ASSIGNMENTS |
|---|---|
| AD | 1 |
| AC | 2 |
| XT | 3 |
| BT | 2 |
| AD | 1 |
| BT | 2 |
| AC | 2 |
| AC | 2 |
| XT | 3 |
| AD | 1 |
| AD | 1 |
| BV | 1 |
| BV | 1 |
| AX | 3 |
| AX | 3 |
| AX | 3 |

The table depicts various data elements and the assignment of each data element to one of three processing phases (1, 2 and 3). In this example, the grid-computing device 100G or computing device 100 can process the four "AD" data elements and the two "BV" data elements during the first processing phase, while waiting until other phases to process other data elements. If, for example, the computing device 100 or grid-computing device 100G is calculating a top-k statistic, intermediate results after the first phase of processing can include information indicating that the data element "AD" occurs four times in the data set 110 (or subset 110S), as well as information indicating that data element "BV" occurs two times.

Additionally, the computing device 100 or grid-computing device 100G can process the 3 "AC" data elements and the two "BT" data elements during the second phase of processing. The intermediate results after the second phase of processing can describe these variables, along with their respective numbers of occurrences (3,2).

In the third phase of processing, the grid-computing device 100G or computing device 100 can process the 2 "XT" data elements, and the 3 "AX" data elements. The intermediate results after the third phase can describe 2 occurrences of data element XT, and 3 occurrences of data element AX.

Figure 4:
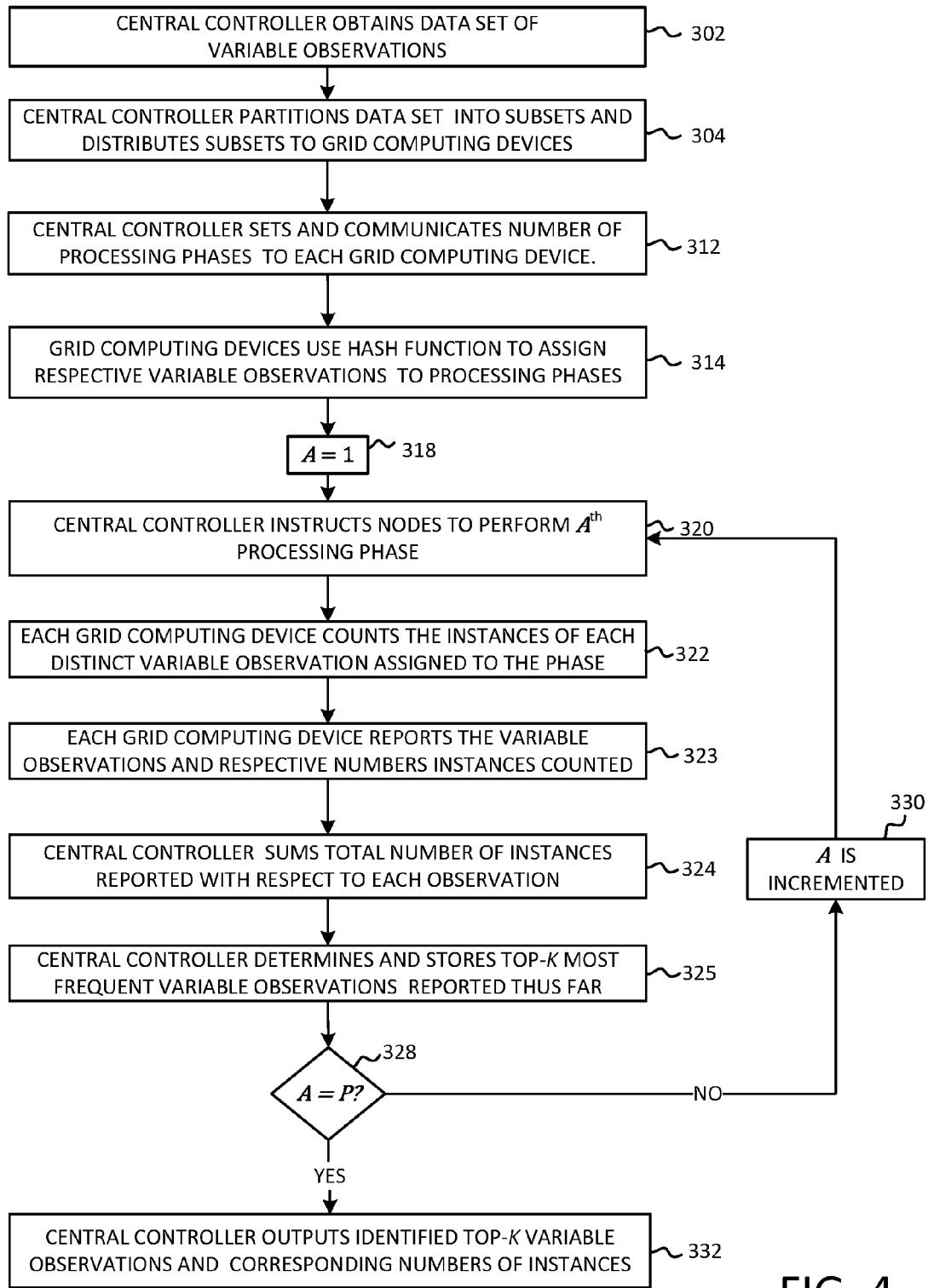
FIG. 4 is a flow chart that depicts an example of procedures for using a grid-computing system to calculate a top-k summary statistic.

FIG. 4 is a flow diagram that illustrates certain parallel processing techniques described herein. The techniques are explained and illustrated in the context of a grid-computing system 120 being used to compute a top-k statistic. As depicted at 302 in FIG. 4, the central controller 130 in the grid-computing system 120 obtains a data set 110 that contains multiple variable observations. Concurrently, the data set 110 may also be stored at the grid-computing devices 100G in the grid-computing system 120, or only at the central controller 130. However, FIG. 4 is explained with reference to an arrangement in which the data set is initially stored only at the central controller 130, and the following discussion is premised on this particular disposition of the data.

At 304, the central controller 130 partitions the data set 110 into subsets 110S and uses data bus 122 (or other communications channels) to distribute the subsets 110S to the grid-computing devices 100G. In this process, each grid-computing device 100G receives and stores the particular subset 110 assigned to it by the central controller 130.

At 312, the central controller 130 sets a number of processing phases (referred to in the FIG. 4 itself as p) that the grid-computing system 120 will use in processing the top-k statistic, and communicates this setting to each of the grid-computing devices 100G. The number of processing phases may be set based on, for example, the number of grid-computing devices 100G available, the size of the data set 110, or any other such processing, storage, or computational complexity consideration that might make a particular number of processing phases more preferable than others. Alternatively, the software 108 executed by each of the grid-computing devices 100G may be encoded to effectuate a fixed number of processing phases in all circumstances, regardless of the characteristics of any given data set 110 to be processed. In such a case, operation 312 may be omitted.

At 314, the grid-computing devices 100G determine a processing phase assignment for each data element in their respectively-assigned data subsets 110S. To make this assignment, the grid-computing devices 100G apply a hash function to each such data element. The same process is used by each of the grid-computing devices 100G in making the assignments.

At 318, the central controller 130 initiates a counter "A" to one. In operations subsequent to 318, the central controller 130 can use the counter for tracking the progression of processing phases. At 320, the central controller 130 instructs the grid-computing devices 100G to perform the $A^{th}$ processing phase. At 322, the grid-computing devices 100G process the $A^{th}$ phase variable observations in their respective data subsets 110S, and each grid-computing device 100G counts the instances of each distinct variable observation assigned to the phase.

At 323, each grid-computing device 100G reports intermediate results to the central controller 130. Specifically, the intermediate results include information about the variable observations and respective numbers of instances counted at 322. At 324, the central controller 130 consolidates the information reported by the grid-computing devices 100G. Consolidating the information can involve, for example, summing the number of reported variable observations in such a way that summing is performed separately with respect to each distinct observation that is reported.

Subsequently, at 325, the central controller 130 determines the k most frequent variable observations reported up to that point, and the total number of times each such observation was counted throughout the grid-computing system 120. The central controller 130 may make this determination by ordering the various sums determined at 324, and determining which observations that correspond to the k highest sums. At 325, if the current processing phase is A=1, the central controller 130 initializes and saves a list of the k most-frequent variable observations thus far reported. In this process, the central controller 130 also stores the number of instances of each such variable observation. Conversely, when A>1, the central controller 130 updates the list that was determined at 325 during the previous processing phase. In this process, the central controller 130 updates the list to reflect the sums most recently obtained at 324.

Subsequently, if the current processing phase is not the last processing phase, as indicated by the decision at 328, then the central controller 130 increments A at 330. Operations 320-325 are then repeated until the final processing phase is determined to have concluded, at 328 (i.e., when A=p).

As depicted at 332, the central controller 130 outputs the identified k most-frequent variable observations, and the corresponding counts obtained for each such observation.

Figure 5:
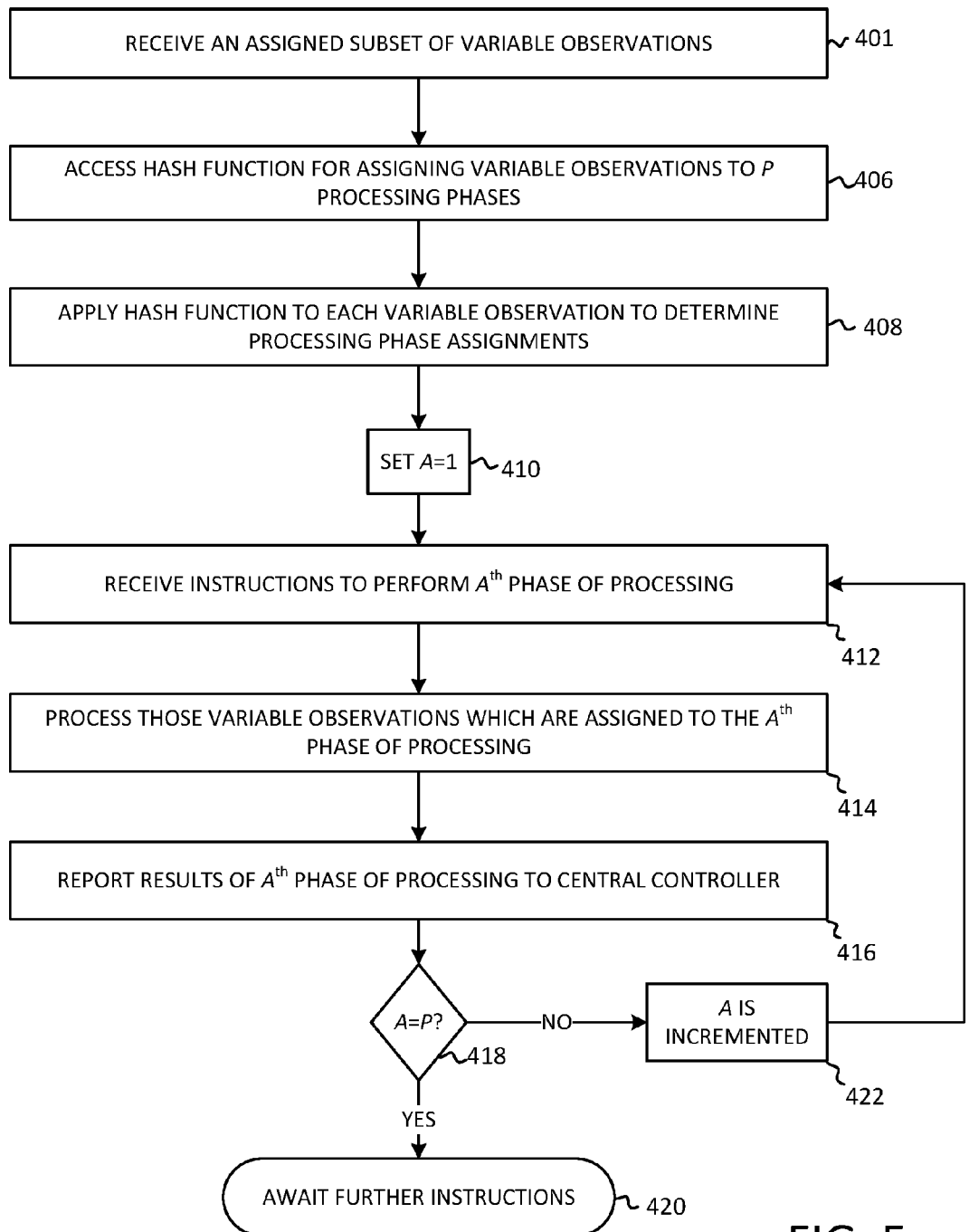
FIG. 5 is a flow chart that shows certain examples of grid-computing device operations within a grid-computing system, while the grid-computing system calculates a top-k summary statistic.

FIG. 5 depicts the operations of FIG. 4 from the perspective of a single grid-computing device 100G in a grid-computing system 120. At 401, the grid-computing device 100G receives variable observations. The variable observations constitute a subset 110S of a larger data set 110 that includes other variable observations and subsets 110S distributed to other grid-computing devices 100G in the grid-computing system 120. At 406, the grid-computing device 100G accesses a hash function for assigning each of the variable observations to one of p processing phases. At 408, the grid-computing device 100G determines processing phase assignments by applying the hash function to each of the variable observations.

At 410, the grid-computing device 100G sets variable A to unity. As in FIG. 4, the variable A designates a current or next scheduled phase of processing. At 412, the grid-computing device 100G receives instructions to perform the $A^{th}$ processing phase. At 414, the grid-computing device 100G processes those integers which are within its assigned subset 110S and have been assigned to the $A^{th}$ phase of processing. The processing at 414 involves maintaining a separate count with respect to each of the variable observations assigned to the $A^{th}$ phase, and using each count to reflect the number of occurrences of the respective variable observation in the assigned data subset. At 416, the grid-computing device 100G reports the results of the $A^{th}$ processing phase to the central controller 130.

At 418, unless A=p, the grid-computing device 100G increments A and operations 412-422 are iteratively executed until A equals p, at 418. When A equals p, then each of the p scheduled processing phases has been completed. Thus, the grid-computing device 100G awaits further instructions, as depicted at 420.

Figure 6:
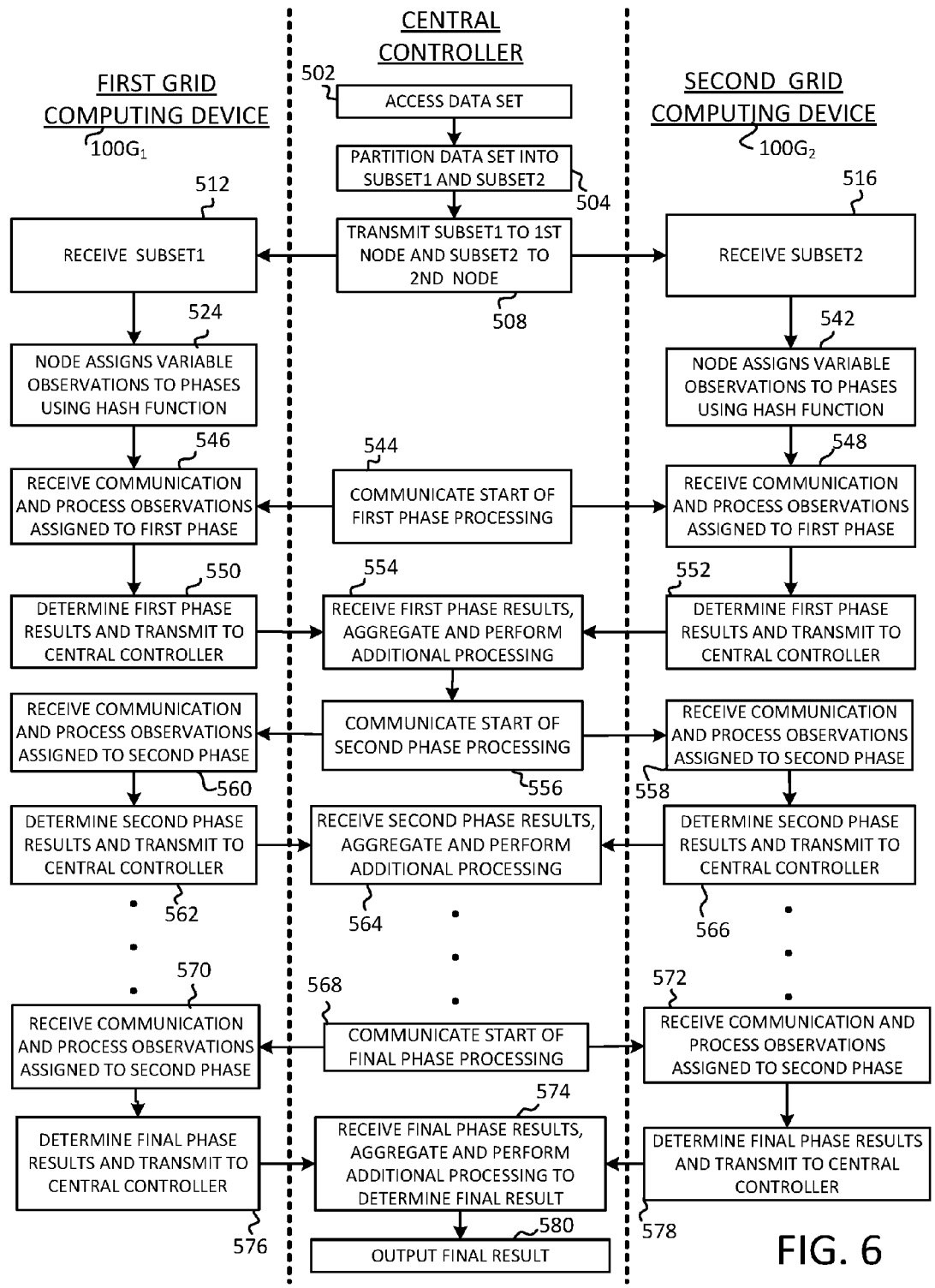
FIG. 6 is a swimlane diagram illustrating an example of procedures used by two grid-computing device within a grid-computing system, while the grid-computing system calculates a top-k summary statistic.

FIG. 6 is an example of a swimlane diagram that illustrates certain of the parallel processing techniques described herein. The techniques are explained and illustrated in the context of a grid-computing system 120 being applied to compute a top-k statistic. The grid-computing system 120 in FIG. 6 includes a central controller 130 and two grid-computing devices 100G. Although the depiction in FIG. 6 specifically shows the use of two grid-computing devices 100G, the techniques and features illustrated by FIG. 6 are readily adaptable to other grid-computing systems, regardless of a number of grid-computing devices operated within such systems. Also, for purposes of brevity, the first and second grid-computing devices 100G referenced in FIG. 6 are also referred to in the drawing as "nodes".

As shown in FIG. 6, the operations begin at 502. At 502, the central controller 130 accesses a data set 110 for which a top-k statistic will be calculated. At 504, the central controller 130 partitions the data set into two subsets 110S. These subsets are referred to in FIG. 6 as SUBSET1 and SUBSET2. At 508, SUBSET1 is transmitted to a first grid-computing device (referred to as $100G_1$ with regard to FIG. 6 only). At about the same time, SUBSET2 is transmitted to a second grid-computing device (referred to as $100G_2$ with regard to FIG. 6 only). The first grid-computing device receives SUBSET1 at 512, and the second grid-computing device $100G_2$ receives SUBSET2 at 516.

At 524, the first grid-computing device $100G_1$ assigns the variable observations in SUBSET1 to phases using a hash function. Concurrently, the second grid-computing device $100G_2$ uses the same hash function to assign the variable observations in SUBSET2 to phases, as depicted at 542.

At 544, the central controller 130 communicates the start of the first processing phase to both the first and second grid-computing devices $100G_1$, $100G_2$. At 546, the first grid-computing device $100G_1$ receives the communication from the central controller 130 and processes the variable observations in SUBSET1 that are assigned to the first phase. This first phase processing involves counting the instances of each distinct variable observation in SUBSET1 that is assigned to the phase.

As shown at 548, the second grid-computing device $100G_2$ also receives the communication from the central controller 130 and processes the variable observations in SUBSET2 that are assigned to the first phase. The first phase processing involves counting the instances of each distinct variable observation in SUBSET2 that is assigned to the phase.

At 550, the first grid-computing device $100G_1$ determines intermediate results that cumulatively represent the processing it has performed. The first grid-computing device $100G_1$ then sends the results to the central controller 130. Similarly, at 552, the second grid-computing device $100G_1$, $100G_2$ determines intermediate results that cumulatively represent the processing it has performed.

At 554, the central controller 130 receives the intermediate results sent by both the first and second grid-computing devices $100G_1$, $100G_2$. The central controller 130 consolidates the intermediate results by performing a summation with respect to each distinct variable observation reported. The central controller 130 then performs additional processing to determine intermediate results that cumulatively represent all processing thus far performed throughout the grid-computing system 120.

Subsequently, at 556, the central controller 130 communicates the start of the second processing phase to both the first grid-computing device $100G_1$ and the second grid-computing device $100G_2$. At 560, the first grid-computing device $100G_1$ receives the communication sent by the central controller at 556, and commences the second phase of processing. In the second phase of processing, the grid-computing device processes only the variable observations in SUBSET1 that are assigned to the second phase. At 558, the second grid-computing device $100G_1$, $100G_2$ receives the communication sent by the central controller at 556, and commences the second phase of processing. In the second phase of processing, the grid-computing device processes only the variable observations in SUBSET2 that are assigned to the second phase. With the exception of the processed data being different, the methodology used by the first and second grid-computing device while performing second phase processing is the same as the methodology used in the first processing phase.

At 562, the first grid-computing device $100G_1$ determines intermediate results that cumulatively represent the processing it has performed. The first grid-computing device $100G_1$ then sends the results to the central controller 130. Similarly, at 566, the second grid-computing device $100G_2$ determines intermediate results that cumulatively represent the processing it has performed.

At 564, the central controller 130 receives the intermediate results sent by both the first and second grid-computing devices $100G_1$, $100G_2$. The central controller 130 aggregates the intermediate results and performs additional processing to determine intermediate results that cumulatively represent all processing thus far performed throughout the grid-computing system 120.

The vertical dots following operations 562, 564 and 566 indicate that the iterative process represented by operations 544-566 is repeated until all but the final processing phase has been completed. At this point, the central controller 130 communicates the final stage of processing to the first and second grid-computing devices 100G$_1$, 100G$_2$, as depicted at 568.

At 570, the first grid-computing device 100G receives the communication sent by the central controller at 568, and commences the final phase of processing. In the final phase of processing at the first grid-computing device 100G, the first grid-computing device 100G processes only the variable observations in SUBSET1 that are assigned to the final phase. At 572, the second grid-computing device 100G$_2$ receives the communication sent by the central controller at 568, and commences the final phase of processing. In the final phase of processing at the second grid-computing device 100G$_2$, the grid-computing device processes only the variable observations in SUBSET2 that are assigned to the final phase.

At 576, the first grid-computing device 100G determines results of the processing performed during the final phase. The first grid-computing device 100G then sends the results to the central controller 130. Similarly, at 572, the second grid-computing device 100G$_2$ determines intermediate results that represent the processing it performed during the final processing phase, and sends these results to the central controller 130.

At 574, the central controller 130 receives the final phase results sent by both the first and second grid-computing devices 100G$_2$. The central controller 130 aggregates the results and performs additional processing to determine final results that cumulatively represent all of the processing performed throughout the grid-computing system 120. The central controller then outputs the final results, as depicted at 580.

FIGS. 7A-7E illustrate operations and computational results obtained at various stages when an example grid-computing system uses certain techniques disclosed herein, during calculation of a top-k statistic for an example data set. The grid-computing system referenced by FIGS. 7A-7E may be the grid-computing system 120 in FIG. 3, and the following explanation is premised on that arrangement. For example, the grid-computing system 120 referenced in FIGS. 7A-7E may be understood to include a central controller 130 and four grid-computing devices 100G. Three processing phases are utilized by the grid-computing system 120 in calculating the top-k statistic.

Although the depictions in FIGS. 7A-7E specifically show the use of four grid-computing devices 100G during computation of a top-k statistic, these drawings depict techniques and features that are readily adaptable to other grid-computing systems, regardless of a number of grid-computing devices operated within such systems. The techniques and features are similarly adaptable for computing other summary statistics, or performing other analytical operations involving observations within a data set. Accordingly, specific details and arrangements depicted in FIGS. 7A-7E are intended to be examples, and should not be understood as limiting the scope of this disclosure. Also, for purposes of brevity, the grid-computing devices 100G referenced in FIGS. 7A-7E are also referred to in the drawing as "nodes". The following discussion will refer to particular grid-computing devices 100G as "nodes" when specific reference is intended.

In FIGS. 7A-7E, the analyzed data set 610 includes forty observations of heights of various individuals, and each height observation is specified based on feet and inches. Additionally, as shown at 609, the objective in performing the top-k calculation is to determine the three (k=3) most frequently occurring height observations within the data set 610.

Figure 7A:
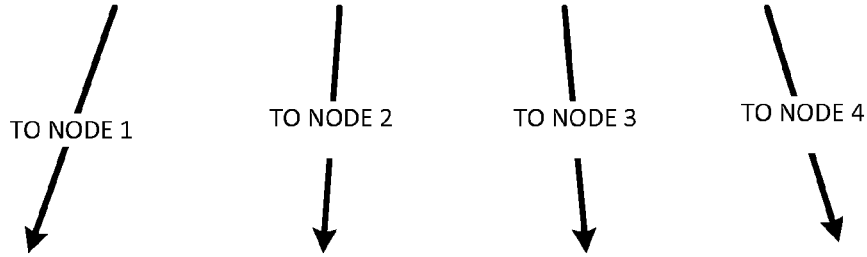
FIGS. 7A-7E depict an example of a sequence of operations and procedures in which certain of the techniques disclosed herein are applied in calculating a top-k statistic for a specific data set.

As depicted in FIG. 7A, the central controller 130 partitions the data set 610 into data subsets, such that one data subset is defined for each of the four grid-computing devices 100G. FIG. 7A also depicts that each of the subsets 614, 616, 618, 620 is assigned or distributed to a particular grid-computing device 100G. Subset 614 is distributed or assigned to node 1. Subsets 616, 618, and 620 are assigned to node 2, node 3, and node 4, respectively.

Figure 7B:
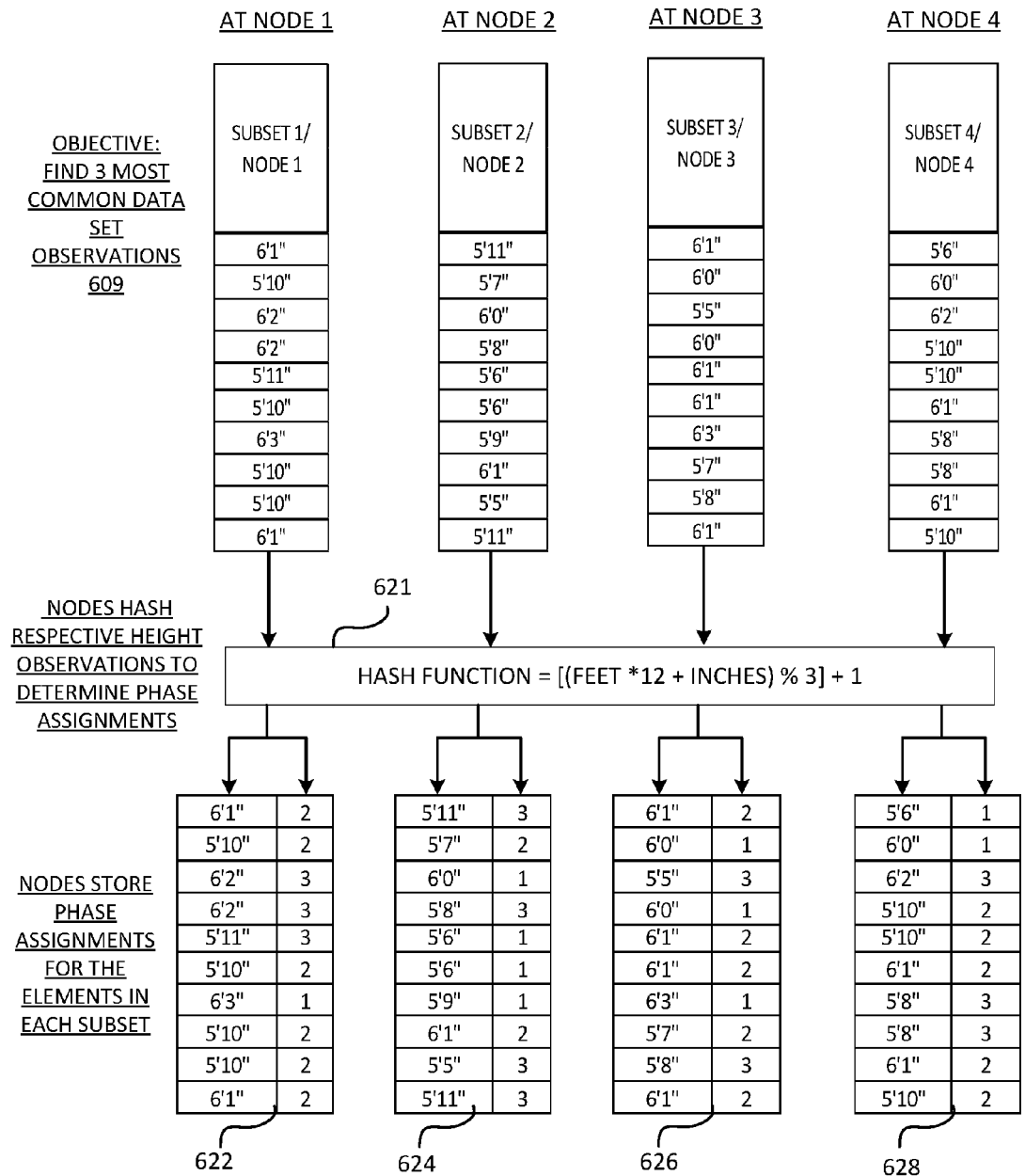

In FIG. 7B, the grid-computing devices 100G hash each variable observation within their respectively assigned subsets 614, 616, 618, 620. The hash function used to hash the variable observations is depicted at 621, and is the same for all four grid-computing devices 100G. The hash function includes a first term (feet*12+inches) in which every height observation is converted to an integer value, and a second term that includes a modular operation on the integer resulting from the first term. The modular operation within the hash function depicted at 621 involves using "3" as the modulus, because three processing phases are used in calculating the top-k statistic.

At each grid-computing device 100G, each height observation is assigned a processing phase based on its hash value. Thus, all height observations corresponding to a hash value of 1 are assigned to the first processing phase, all height observations corresponding to a hash value of 2 are assigned to the second processing phase, and so on. At 622, FIG. 7B depicts the hash values and, by extension, the processing phase assignments for height observations at the first grid-computing device 100G. The hash values and processing phase assignments for the height observations at the second, third, and fourth node are depicted at 624, 626, and 628, respectively.

Figure 7C:
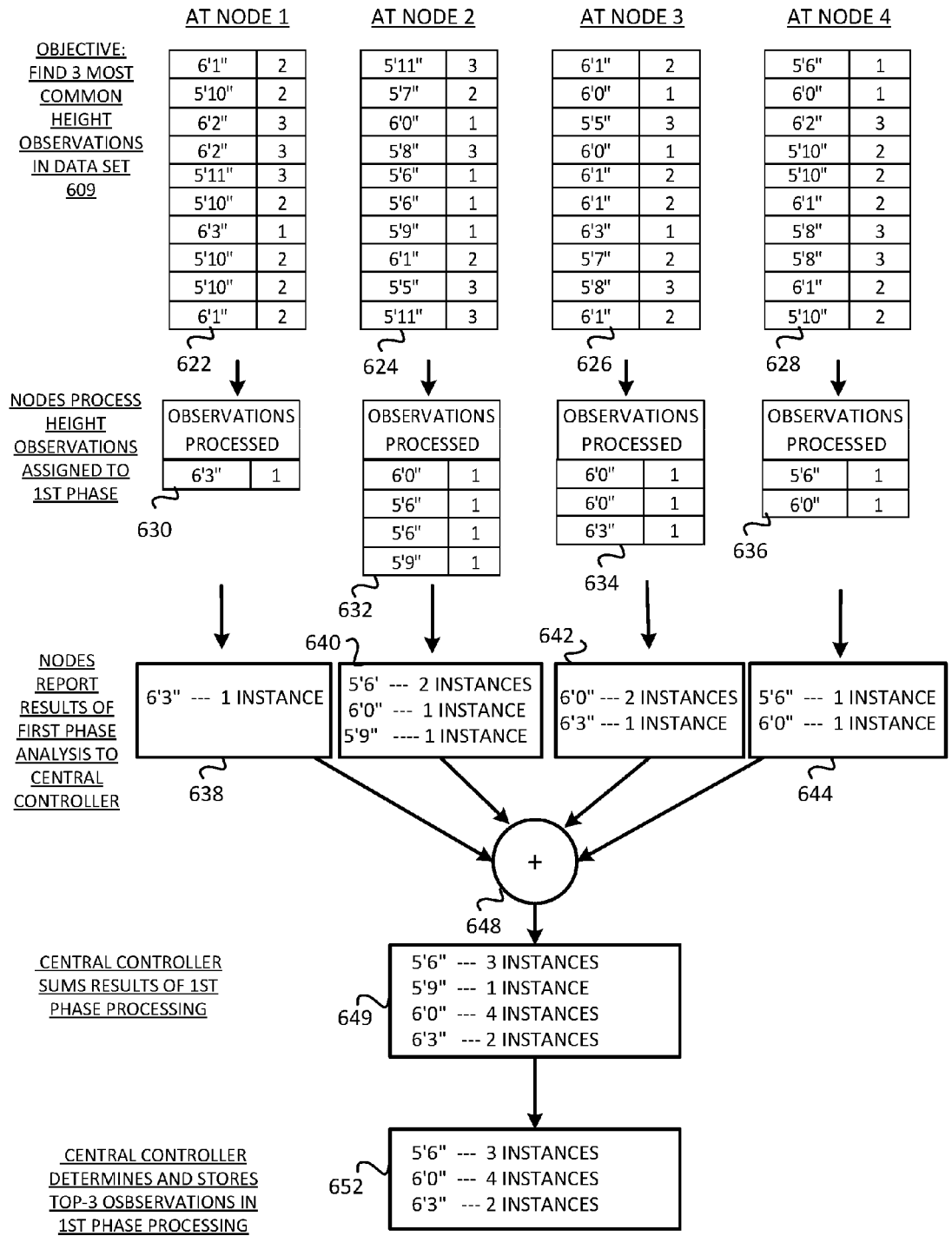

FIG. 7C depicts the first phase of processing in the grid-computing system 120. As depicted, the four grid-computing devices 100G identify and process the height observations assigned to the first phase within their respective subsets 614, 616, 618, 620. The height observations processed at the first grid-computing device are shown at 630. The height observations processed at the second, third and fourth grid-computing devices are shown at 632, 634 and 636, respectively.

In processing height observations assigned to the first phase, the grid-computing devices 100G inventory their respective subsets by counting the number of occurrences of each distinct height observation assigned to the first phase. The sums or numbers generated in this process are intermediate results, but can be referred to more specifically as distributed counts.

At the end of the phase, the grid-computing devices 100G send their respective distributed counts to the central controller 130, so that they may be used to determine intermediate results that represent all first phase data in the complete data set 610, as opposed to the individual subsets 614, 616, 618, 620 partially inventoried by the grid-computing devices 100G. The distributed counts sent by the grid-computing devices are shown at 638, 640, 642 and 643.

The central controller 130 computes overall intermediate results by consolidating (alternatively referred to hereinafter as "synthesizing") the intermediate results reported by the grid-computing devices 100G. The consolidation is performed separately with respect to each unique variable observation. This consolidation process involves summing all counts that correspond to the same variable observation, as shown at 648. The summing operation results in a combined inventory that represents all first phase data in the complete data set, which is shown at 649.

Because the computational objective is to determine the three most frequently occurring variable observations, the central controller 130 uses the inventory at 649 to identify the three variable observations associated with the highest counts. These three observations are shown at 652. The list at 652 contains the variable observations 5'6", 6'0" and 6'3", as these variable observations occur more frequently than any other first phase observations within the data set 610. The central controller 130 stores a record of the three observations, and their respective counts.

However, intermediate information need not be stored for the purpose of maintaining counts of other variable observations (i.e., those not on the list at 652) processed during the first phase. That is, information need not be stored with regards to the number of instances of the observation 5'9" that were counted in the first phase. This fact results from processing the data set 610 in phases, and hashing variable observations in such a way that all variable observations are assigned to the same phase as all other variable observations that they are identical to. For example, following the first phase, 5'9" can be eliminated from consideration as an answer to the top-k problem because the first processing phase reveals that it is not even a top-k observation when only first phase observations are considered.

Figure 7D:
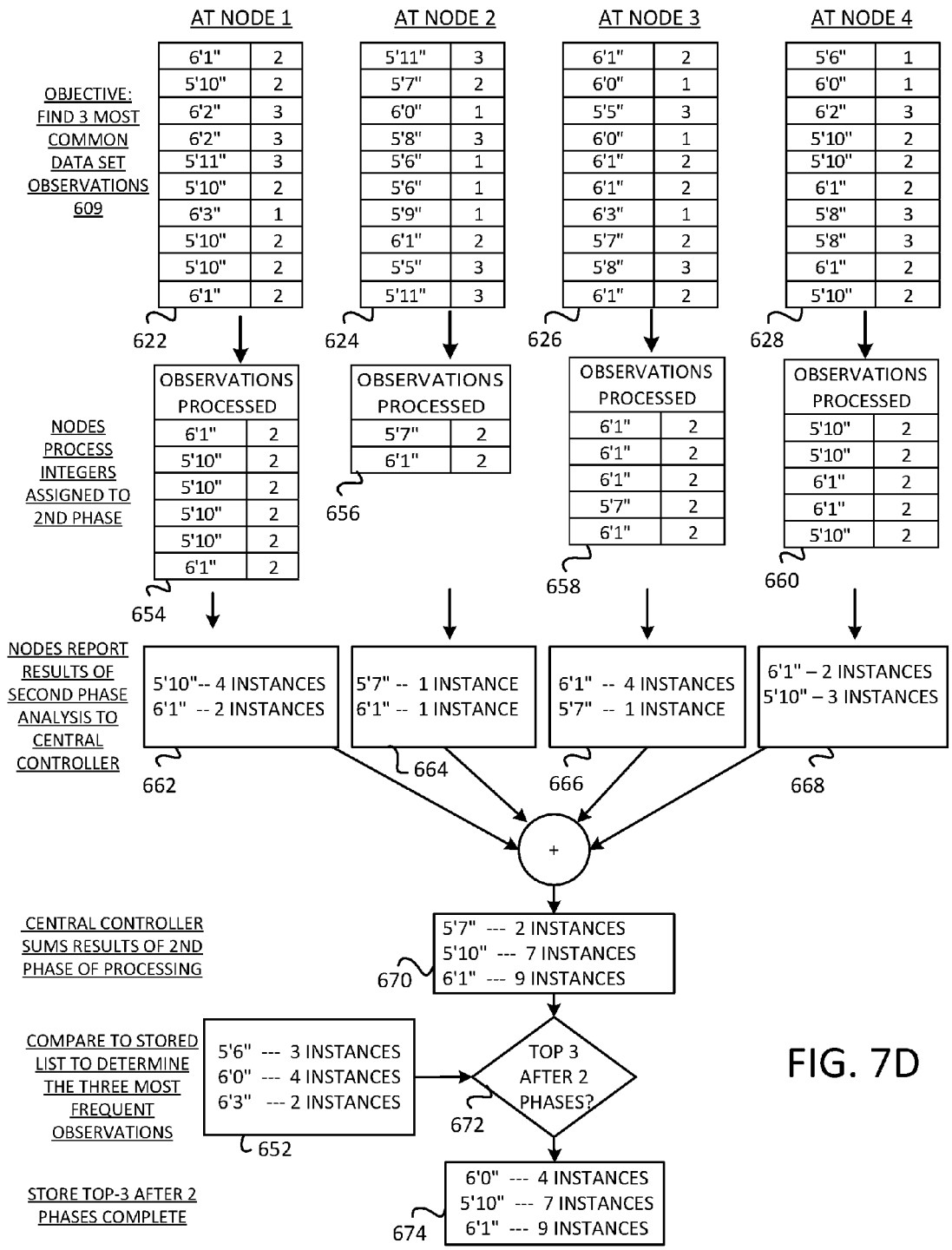

The second processing phase begins after the central controller 130 stores the list depicted at 652. FIG. 7D depicts processing operations performed during the second processing phase, and the results calculated during these operations. The explanation of second phase processing operations and intermediate results 654-670 is generally the same as the explanation provided with respect to the first phase processing operations and intermediate results 630-649. The only significant difference is that the operations and results 654-670 involve the height observations assigned to the second phase rather than the first phase. Thus, the combined inventory of second phase variable observations (shown at 670 in FIG. 7D) is analogous to the combined inventory of first phase variable observations (as shown at 649 in FIG. 7C).

At 672, after the combined second phase inventory has been obtained, the central controller 130 determines the three most common variable observations processed theretofore. To make this determination, the central controller 130 compares the counts provided by the second phase inventory to the counts associated with the three most common variable observations processed during the first phase (e.g., the list of counts previously stored at 652). In this comparison, the central controller 130 determines the three most common variable observations provided by the two compared lists. These three most common variable observations are stored, as depicted at 674.

Figure 7E:
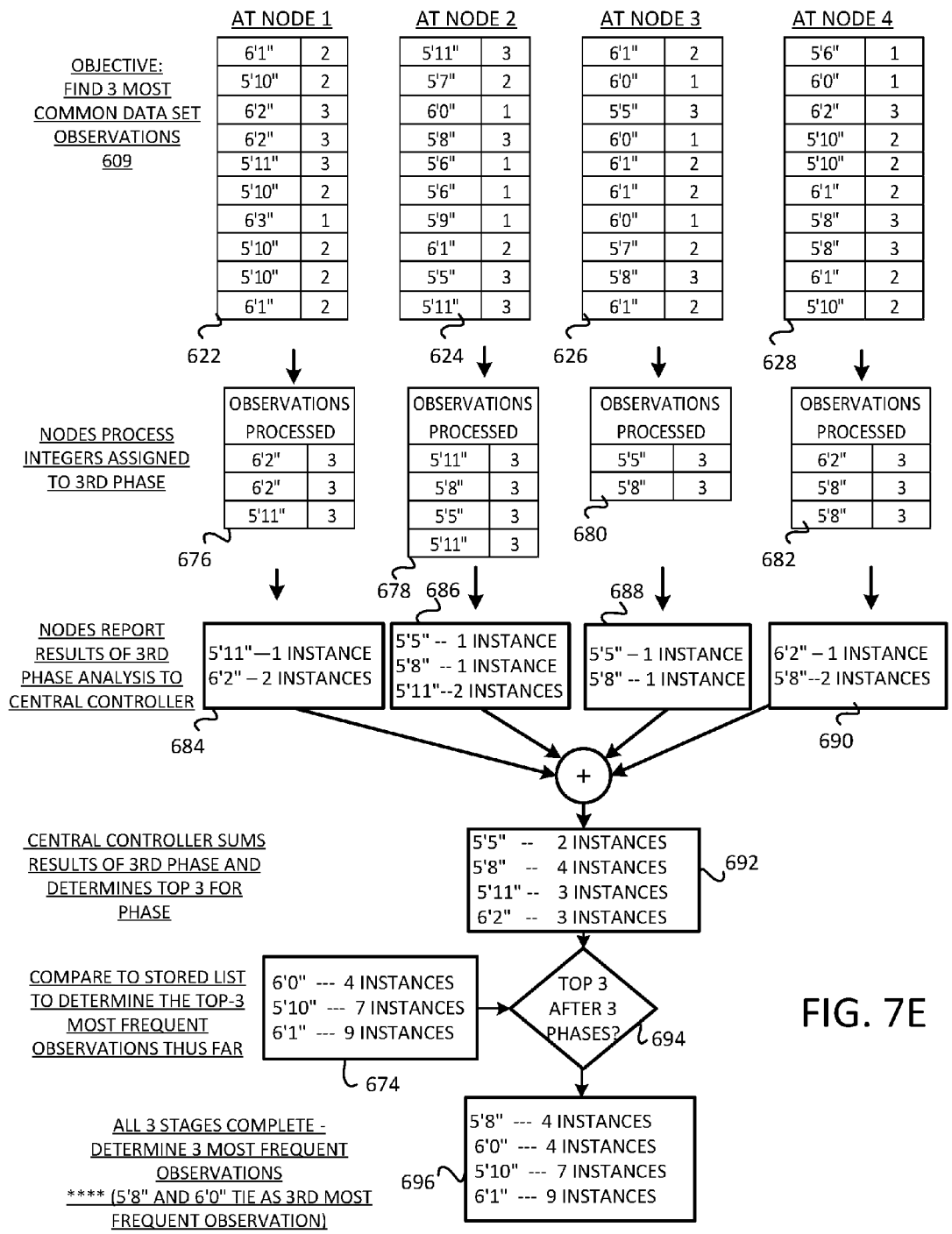

Subsequently, the grid-computing system 120 begins the third phase of processing, which is depicted in FIG. 7E. The explanation of third phase processing operations and intermediate results 676-696 is generally the same as the explanation provided with respect to the second phase processing operations and intermediate results 654-674. However, the operations and results 676-692 involve the variable observations assigned to the third phase rather than the second phase. Thus, the combined third phase inventory (shown at 692 in FIG. 7E) is analogous to the combined second phase inventory (as shown at 670 in FIG. 7C).

Additionally, at 694, when the central controller 130 determines the three most common variable observations processed up to that point, this determination is based on the counts stored at 674, and the combined third phase inventory. Because the third phase is the final stage, the determination made at 694 is the final answer to the top-k statistical inquiry. Thus, as depicted at 696, 5'8", 6'0", 5'10" and 6'1" are the three most common variable observations in the data set shown at 610. In this case, four distinct observations are outputted because both 5'8" and 6'0" occur four times in the data set. Thus, both of these two observations are the third-most common observation.

FIGS. 8A-8F illustrate an additional approach to using processing phases in an example grid-computing system 120 during calculation of a top-k statistic for an example data set. The grid-computing system referenced by FIGS. 8A-8F may be the grid-computing system 120 in FIG. 3, and the following explanation is premised on that arrangement.

For example, the grid-computing system 120 referenced in FIGS. 8A-8F includes a central controller 130 and three grid-computing devices 100G, and two processing phases are utilized by the grid-computing system 120 in calculating the top-k statistic.

FIG. 8A depicts the analyzed data set at 710. The analyzed data set 710 includes thirty-nine observations of heights, and each height observation is specified based on units of feet and inches. Additionally, as shown at 702, the objective in performing the top-k calculation is to determine the two most frequently occurring height observations within the data set 710 (i.e., k=2).

Figure 8B:
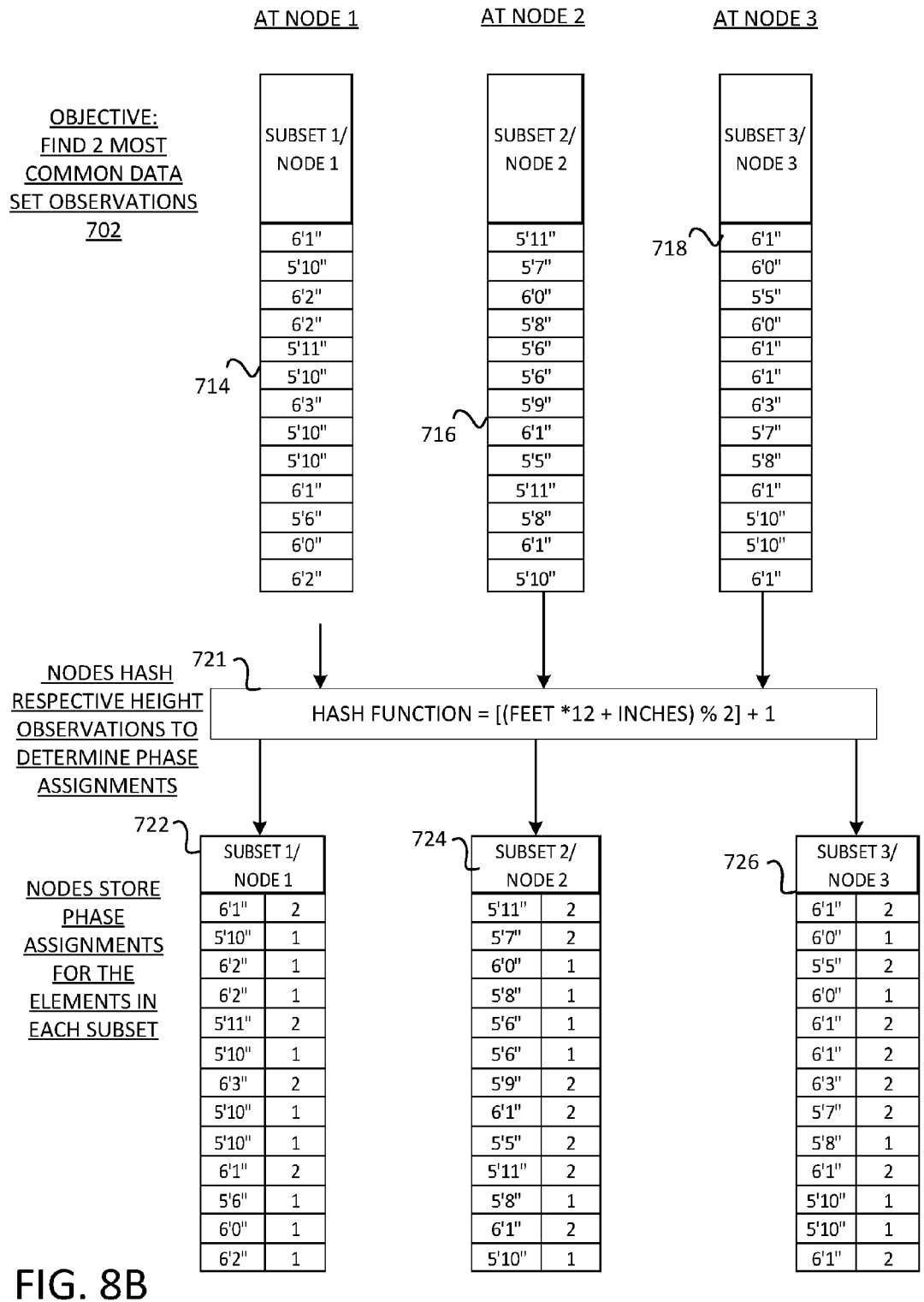

As depicted in FIG. 8A, the central controller 130 partitions the data set 710 into data subsets, such that one data subset is defined for each of the three grid-computing devices (referred to as "nodes" in FIGS. 8A-8F and the corresponding explanation). FIG. 8A also depicts that each subset 714, 716 and 718 is assigned or distributed to a particular grid-computing device 100G. In FIGS. 8A-8F and the discussion of these drawings, individual grid-computing devices 100G are specifically referred to as node 1, node 2, and node 3. Subset 714 is distributed or assigned to node 1. Subsets 716 and 718 are assigned to node 2, and node 3, respectively.

As shown in FIG. 8B, the grid-computing devices 100G hash each variable observation in their respectively assigned subsets 714, 716, 718. The hash function used to hash the variable observations is depicted at 721, and is the same for all three grid-computing devices. The hash function includes a first operation (feet*12+inches) that effectively converts every height observation to an integer value, and a second operation that includes performing a modular operation on the integer resulting from the first operation. The modular operation within the hash function depicted at 721 involves "2" as the modulus, because the grid-computing system 120 is set to use two processing phases in calculating the top-k statistic.

As in FIG. 7B, each variable observation is assigned a processing phase based on its hash value. Thus, all variable observations corresponding to a hash value of "1" are assigned to the first processing phase, and all variable observations corresponding to a hash value of "2" are assigned to the second processing phase. The hash values and, by extension, the processing phase assignments for the variable observations at the first node are depicted at 722.

The hash values and processing phase assignments for the variable observations at the second and third node are depicted at 724 and 726, respectively.

Figure 8C:
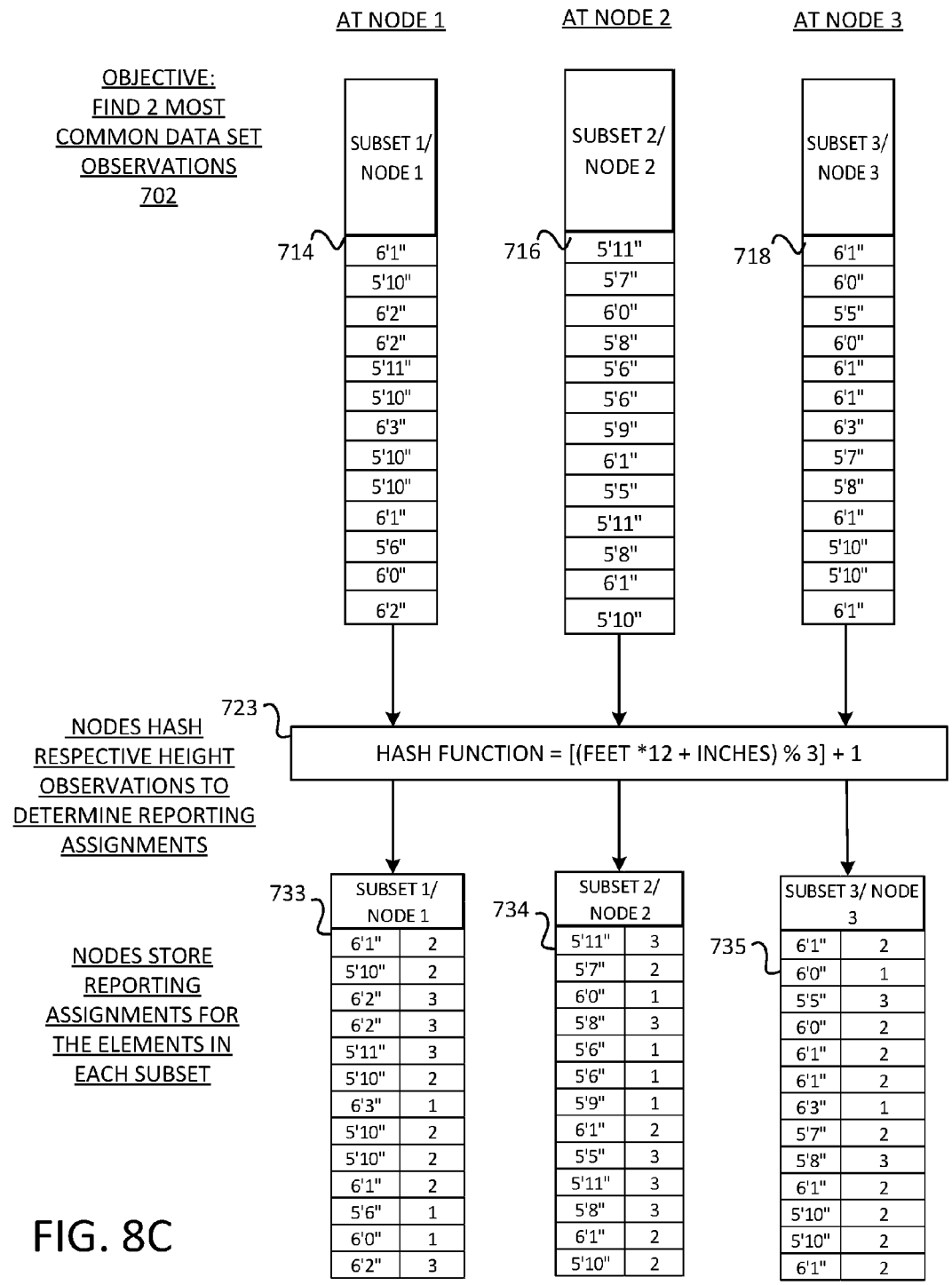

As shown in FIG. 8C, the grid-computing devices 100G use an additional hash function to determine reporting assignments for distinct variable observations. Each distinct variable observation is given a reporting assignment. The reporting assignments are for use by the grid-computing devices 100G at the end of the processing phases, after the grid-computing devices 100G have determined variable observation counts. The various counts determined for each particular observation are reported to a grid-computing device 100G specified for the observation, where they are consolidated and stored. A variable observation reporting assignment designates the particular grid-computing device 100G used to consolidate the various distributive counts of the observation (i.e., sum the counts), and store the consolidated result.

Because it can be efficient to use all grid-computing devices 100G equally for consolidation and storage, the hash function used to determine reporting assignments can be selected to provide an approximately even distribution of reporting assignments. Moreover, because three grid-computing devices 100G are available to consolidate and store counts, the hash function includes a modular operation, with "3" as the modulus. With the incorporation of this modular operation in the hash function, the hash function range includes three integers: 1, 2 and 3. Thus, each variable observation hash can be used directly as the observation's reporting assignment.

The hash values and, by extension, the reporting assignments for the variable observations at the first node are depicted at 733. The hash values and processing phase assignments for the variable observations at the second and third node are depicted at 734 and 735, respectively.

Figure 8D:
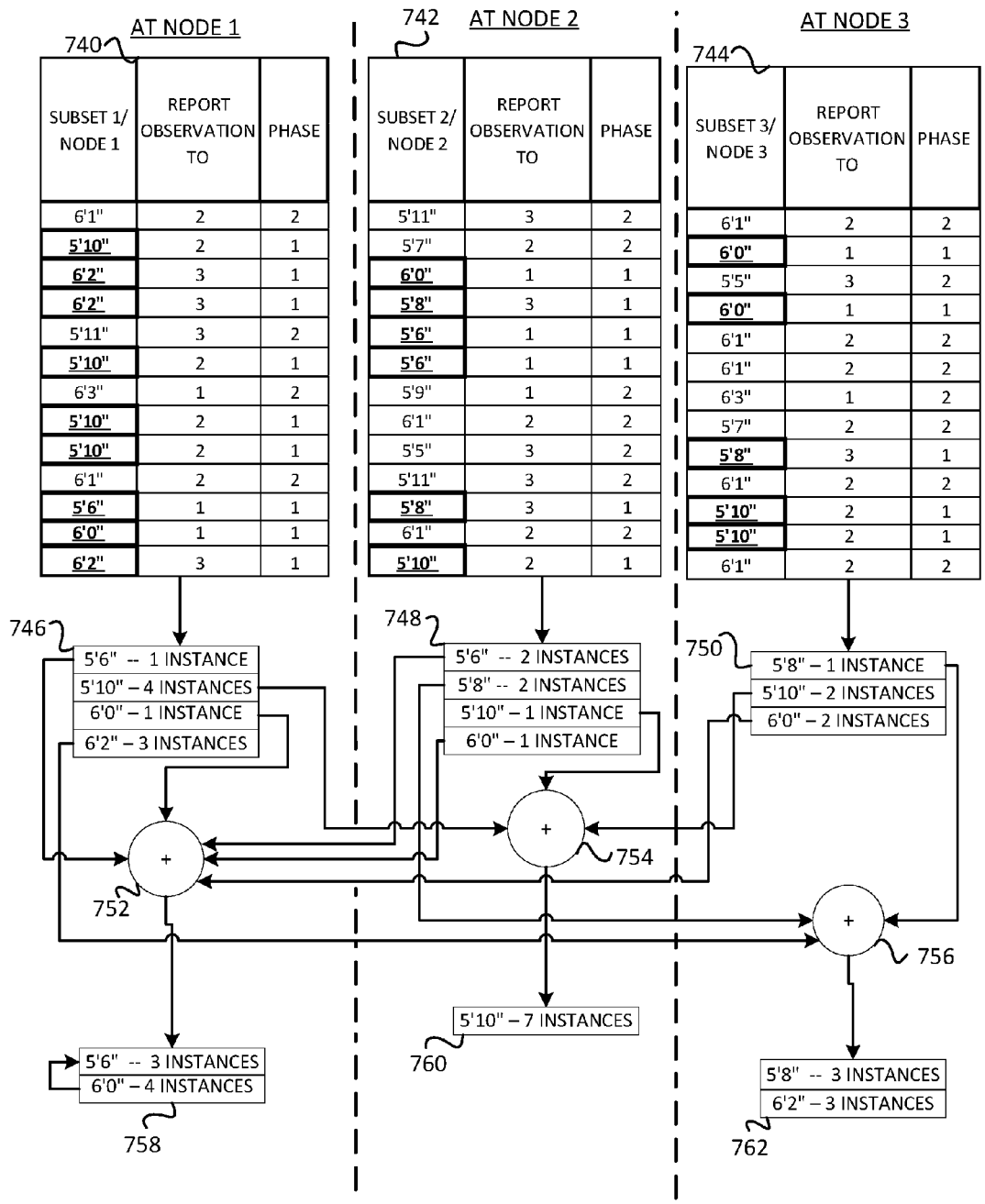

FIG. 8D depicts the first phase of processing in the grid-computing system 120. At the top of page 8D, the data subset assigned to the first node is shown at 740, along with the phase and reporting assignments for each variable observation in the subset. The variable observations in the subsets assigned to the second and third node are shown at 742 and 744, respectively, along with corresponding phase assignments and reporting assignments.

In the first phase of processing, each grid-computing device 100G processes first phase variable observations in its respective subset. In each case, this processing involves inventorying distinct variable observations and counting how many times each such observation occurs within the subset. The first phase observations are indicated by the highlighting and underlining at 740, 742 and 744. The distributed counts registered for the various first phase variable observations at the first node are shown at 746. Similarly, the distributed counts registered at the second node and are shown at 748 and 750, respectively.

FIG. 8D shows that, subsequent to the first phase inventorying, the grid-computing devices 100G report variable observation counts as dictated by the reporting assignments. For example, node 1 communicates to node 3 that the variable observation 6'2" was counted three times. Node 1 communicates this information to node 3 because node 1 previously calculated a reporting assignment of 3 for the observation 6'2". Similarly, node 2 reports to node 1 that the variable observation "6'0" was counted once within subset 742, and node 3 reports to node 1 that the observation was counted twice within subset 744.

During the first phase, after all reporting of distributed counts is complete, each grid-computing device 100G sums the reported counts for its assigned variable observations. This summing is shown at 752, 754 and 756. The results of these summing operations are seen at 758, 760 and 762. The information at 758, 760 and 762 collectively forms a combined inventory of first phase variable observations. The first, second and third nodes store the information shown at 758, 760 and 762, respectively.

Figure 8E:
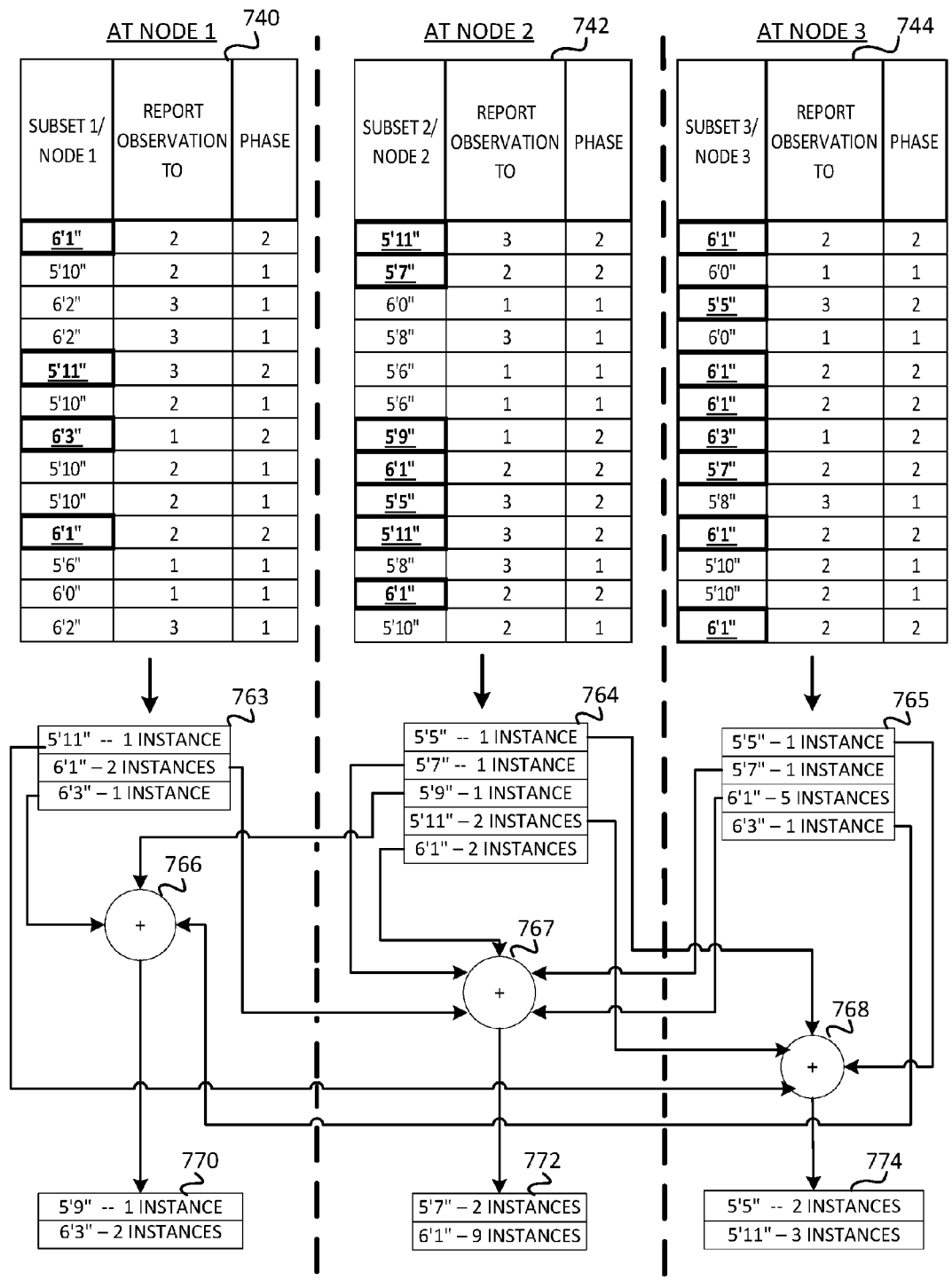

Subsequently, the second phase of processing begins, as depicted in FIG. 8E. At the top of page 8E, the data subset assigned to the first node is again shown at 740 for reference, along with the phase and reporting assignments for each variable observation in the subset. The subsets assigned to the second and third node are also shown again at 742 and 744, respectively, along with corresponding phase assignments and reporting assignments. Because FIG. 8E depicts the second processing phase, the second phase variable observations are emboldened and underlined at 740, 742 and 744.

In FIG. 8E, the processing procedures and results 763-774 parallel the procedures and results shown at 746-762 in FIG. 8D. The primary difference between the procedures and results depicted at 763-774 and those depicted at 746-762 relates to the variable observations processed. Rather than variable observations assigned to the first phase, the procedures and results depicted at 763-774 are related to second phase variable observations.

Figure 8F:
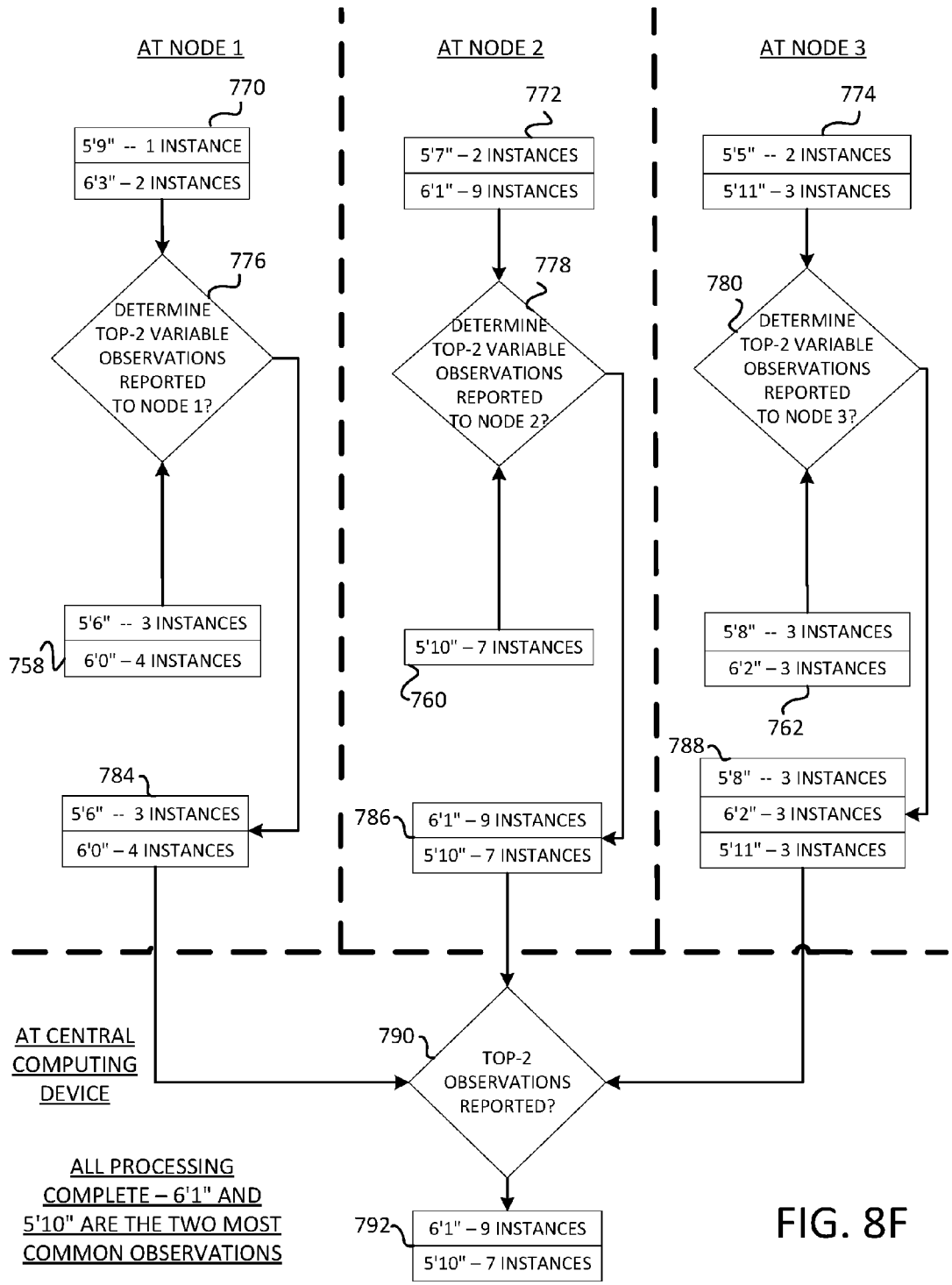

The processing performed in the second phase yields the inventory information at 770, 772 and 774. This information collectively forms a combined inventory of second phase variable observations. Subsequently, the grid-computing devices 100G process the first phase results in conjunction with the second phase processing results. This processing is also done in a distributed manner, as depicted in FIG. 8F, at 776, 778 and 780. Much like the summing operations 752-756 and 766-768, the processing is distributed based on the reporting assignments of the variable observations. Results of the distributed processing are shown at 784, 786 and 788. The grid-computing devices 100G report these results to the central controller 130.

As shown at 790, the central controller 130 performs additional processing of the results, in order to determine the 2 most frequently occurring variable observations in the data set 710. The result of this processing is depicted at 792. As shown at 792, variable observations 6'1" and 5'10" are the most commonly occurring variable observations in data set 710. The central controller 130 outputs these variable observations as the answer to the top-k inquiry made with regards to data set 710.

Figure 9:
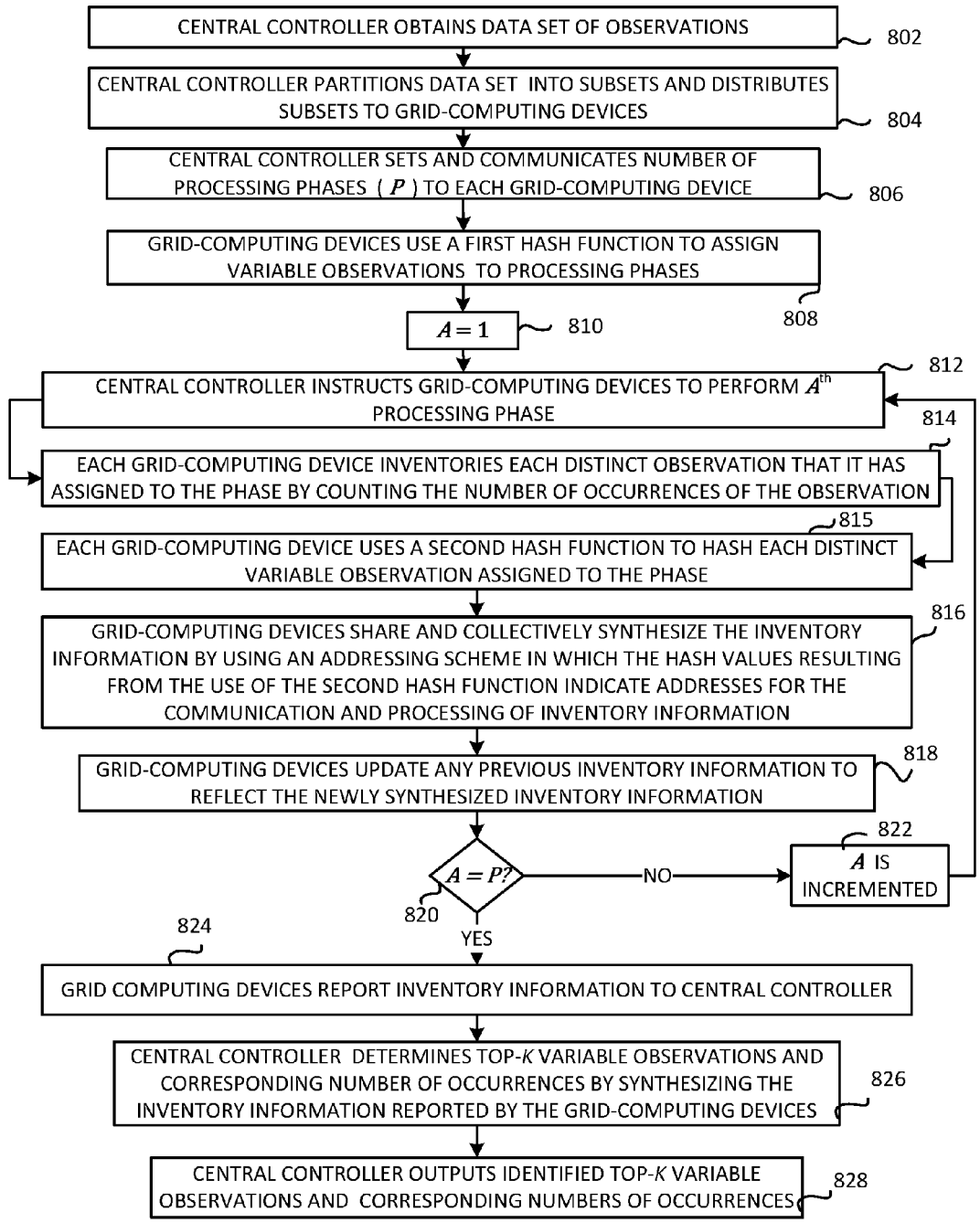
FIG. 9 is a flowchart illustrating an example of certain of the processing operations for computing a summary statistic that are described in this disclosure.

FIG. 9 depicts one example of a sequence of operations for computing a top-k summary statistic in a grid-computing system. Certain of the methodologies that were previously described in the explanation of FIGS. 8A-8F are also presented as part of FIG. 9.

The operations shown in FIG. 9 begin at 802. At 802, a central controller obtains a data set of observations. At 804, the central controller partitions the data set into subsets and distributes subsets to grid-computing devices. At 806, the central controller sets and communicates a number of processing phases (P) to each grid-computing device.

At 808, the grid-computing devices use a first hash function to assign variable observations to processing phases. At 810, a reference variable (A) is initialized to 1. At 812, the central controller instructs the grid-computing devices to perform the $A^{th}$ processing phase. At 814, each grid-computing device inventories each distinct variable observation that it has assigned to the phase by counting the number of occurrences of the observation.

At 815, each grid-computing device uses a second hash function to hash each distinct variable observation assigned to the phase. At 816, the grid-computing devices share and collectively synthesize the inventory information by using an addressing scheme in which the hash values resulting from the use of the second hash function indicate addresses for the communication and processing of inventory information.

At 818, the grid-computing devices update any previous inventory information to reflect the newly synthesized inventory information. At 820, the grid-computing device determine whether A equals P. If A is equal to P, then A is incremented at 822, and the procedural sequence 812-822 is repeated until A is equal to P.

Once the grid-computing device determine that A is equal to P at 820, they report inventory information to the central controller, as depicted at 824. At 826, the central controller determines the top-k variable observations and corresponding numbers of occurrences. The central controller makes these determinations by synthesizing the inventory information reported by the grid-computing devices. At 828, the central controller outputs the identified top-k variable observations and corresponding numbers of occurrences.

Figure 10:
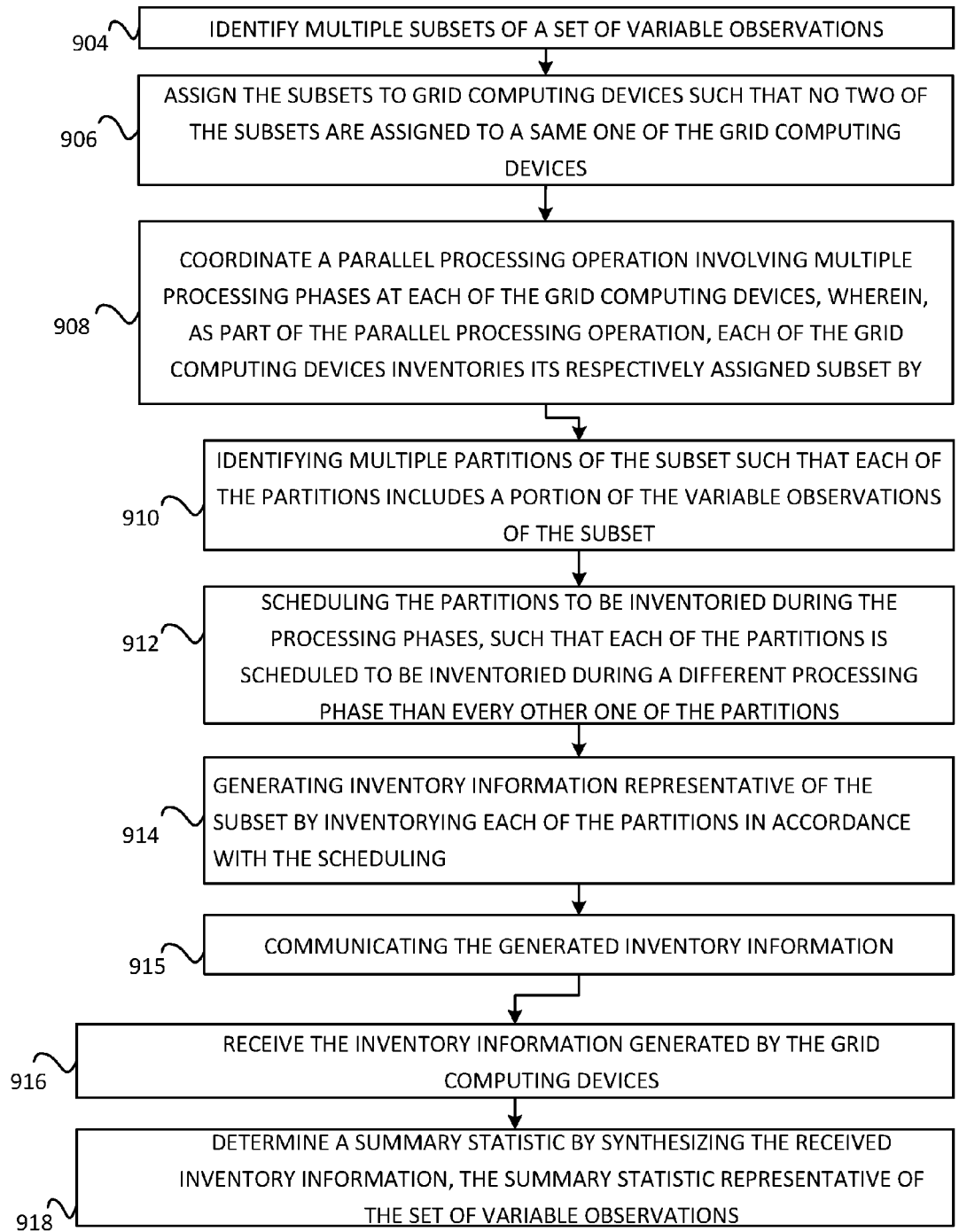
FIG. 10 is a flowchart that presents one example of a sequence of operations for computing a summary statistic.

FIG. 10 is a depiction of certain operations for computing a summary statistic, as described herein. At 904, a central controller identifies multiple subsets of a set of variable observations. At 906, the central controller assigns the subsets to grid-computing devices such that no two of the subsets are assigned to the same one of the grid-computing devices. At 908, the central controller coordinates a parallel processing operation involving multiple processing phases at each of the grid-computing devices, where, as part of the parallel processing operation, each of the grid-computing devices inventories its respectively assigned subset by performing the following operations shown at 910-919 in FIG. 10:

a) identifying multiple partitions of the subset such that each of the partitions includes a portion of the variable observations of the subset;

b) scheduling the partitions to be inventoried during the processing phases, such that each of the partitions is scheduled to be inventoried during a different processing phase than every other one of the partitions;

c) generating inventory information representative of the subset by inventorying each of the partitions in accordance with the scheduling; and d) communicating the generated inventory information.

At 910, the central controller 130 receives the inventory information generated by the grid-computing devices. At 912, the central controller 130 determines a summary statistic by synthesizing the received inventory information, the summary statistic representative of the set of variable observations.

FIG. 11 is a depiction of certain operations for computing a summary statistic, as described herein. The operations are executed by a central controller and multiple grid-computing devices. At 1002, the central controller identifies multiple subsets of a set of variable observations. At 1004, the central controller assigns each of the grid-computing devices to analyze one of the subsets.

As depicted at 1006-1018, each of the grid computing devices:

computes hash values by using a hash function to hash observations in the subset that the grid-computing device is assigned to analyze;

associates each of the hash values with one of the grid-computing devices;

computes information about observations in the subset that the grid-computing device is assigned to analyze;

communicates portions of the information to grid-computing devices associated with the hash values;

retains a portion of the information;

receives information computed by the grid-computing devices associated with the hash values; and generates a summary of a portion of the set, wherein generating the summary includes synthesizing the retained portion of information and the received information.

At 1020, the central controller receives the summaries communicated by the grid-computing devices. At 1022, the central controller computes the statistic by synthesizing the summaries.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score with virtually no regards on the size of the data stored in Hadoop®. Some systems may use SAS In-Memory Statistics for Hadoop® to read big data once and analyze it several times by persisting it in-memory for the entire session. The disclosed embodiments are not limited to these types of systems.

The methods, systems, devices, implementations, and embodiments discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional operations not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the current disclosure. Also, a number of operations may be undertaken before, during, or after the above elements are considered. Accordingly, the above description does not bound the scope of the claims.

The use of "capable of", "adapted to" or "configured to" herein is meant as open and inclusive language that does not foreclose devices adapted to or configured to perform additional tasks or operations. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A computer-program product tangibly embodied in a non-transitory, machine-readable storage medium, the storage medium comprising:
    stored instructions executable to cause a grid-computing device to:
        access a first subset of a set of observations while being operated in a grid-computing system that includes multiple additional grid-computing devices configured to access additional subsets of the set;
        compute hash values by using a hash function to hash observations in the first subset;
        generate associations by associating the hash values with the additional grid-computing devices;
        compute information about observations in the first subset;
        designate a first portion of the computed information to be retained at the grid-computing device and designate other portions of the computed information to be communicated to the additional grid-computing devices, wherein designating the first portion of the computed information and designating the other portions of the computed information is done using an addressing scheme that is based on the associations;
        retain the first portion of the computed information at the grid-computing device;
        communicate the other portions of the computed information to the additional grid-computing devices;
        receive additional information computed by the additional grid-computing devices, wherein the received additional information is about observations in the additional subsets;
        generate a summary by aggregating the retained portion of the computed information and the received additional information; and
        communicate the generated summary to another computing device configured to use the generated summary to compute a statistic that provides statistical information about the observations in the set.

2. The computer-program product of claim 1, wherein the statistic is a top-k statistic that indicates distinct observations that are more prevalent in the set than other distinct observations not indicated by the statistic.

3. The computer-program product of claim 2, wherein the instructions are further executable to cause the grid-computing device to compute the statistical information about observations in the first subset by using an inventory process.

4. The computer-program product of claim 3, wherein the inventory process includes inventorying during multiple processing phases.

5. The computer-program product of claim 4, wherein inventorying during multiple processing phases includes:
    computing additional hash values; and
    using the additional hash values to determine assignments of observations to processing phases.

6. The computer-program product of claim 1, wherein a range of the hash function consists of a number (n) of integers, and wherein the additional grid-computing devices consist of n−1 grid-computing devices.

7. The computer-program product of claim 6, wherein the instructions are further executable to cause the grid-computing device to use the hash function to hash observations by performing a modular operation in which n is a modulus.

8. The computer-program product of claim 7, wherein the observations in the set include multiple non-integer observations, and wherein the instructions are further executable to cause the grid-computing device to use the hash function to hash observations by further converting non-integer observations to integers.

9. The computer-program product of claim 8, wherein each of the additional grid-computing devices is further configured to compute a summary of a subset of the set, wherein computing a summary includes processing at least one of the other portions of the computed information, and wherein computing the statistic includes aggregating summaries computed by the additional grid-computing devices.

10. The computer-program product of claim 9, wherein the instructions are further executable to cause the grid-computing device to communicate the generated summary to a central computing device in the grid-computing system.

11. The computer-program product of claim 1, wherein communicating the other portions of the computed information is such that no two of the other portions are communicated to a same one of the additional grid-computing devices.

12. The computer-program product of claim 11, wherein, with respect to each of the other portions of the computed information, the addressing scheme identifies a particular one of the additional grid-computing devices as a destination.

13. A method comprising:
accessing a first subset of a set of observations at a grid-computing device being operated in a grid-computing system that includes multiple additional grid-computing devices configured to access additional subsets of the set;
computing hash values by using a hash function to hash observations in the first subset;
generating associations by associating the hash values with the additional grid-computing devices;
computing information about observations in the first subset;
designating a first portion of the computed information to be retained at the grid-computing device and designating other portions of the computed information to be communicated to the additional grid-computing devices, wherein designating the first portion of the computed information and designating the other portions of the computed information is done using an addressing scheme that is based on the associations;
retaining the first portion of the computed information at the grid-computing device;
communicating the other portions of the computed information to the additional grid-computing devices;
receiving additional information computed by the additional grid-computing devices, wherein the received additional information is about observations in the additional subsets;
generating a summary by aggregating the retained portion of the computed information and the received additional information; and
communicating the generated summary to another computing device configured to use the generated summary to compute a statistic that provides statistical information about the observations in the set.

14. The method of claim 13, wherein the statistic is a top-k statistic that indicates distinct observations that are more prevalent in the set than other distinct observations not indicated by the statistic.

15. The method of claim 14, wherein the first grid-computing device uses an inventory process to compute the statistical information about observations in the first subset.

16. The method of claim 15, wherein the inventory process includes inventorying during multiple processing phases.

17. The method of claim 16, wherein inventorying during multiple processing phases includes:
computing additional hash values; and
using the additional hash values to determine assignments of observations to processing phases.

18. The method of claim 13, wherein a range of the hash function consists of a number (n) of integers, and wherein the additional grid-computing devices consist of n−1 grid-computing devices.

19. The method of claim 18, wherein the grid-computing device and the additional grid-computing devices use the hash function to hash observations by performing a modular operation in which n is a modulus.

20. The method of claim 19, wherein the observations in the set include multiple non-integer observations, and wherein the grid-computing device and the additional grid-computing devices use the hash function to hash observations by further converting non-integer observations to integers prior to performing the modular operation.

21. The method of claim 20, wherein each of the additional grid-computing devices computes a summary of a subset of the set by processing at least one of the other portions of the computed information, and wherein computing the statistic includes aggregating summaries computed by the additional grid-computing devices.

22. The method of claim 21, wherein the summaries computed by the additional grid-computing devices and the generated summary are communicated to a central computing device in the grid-computing system, and wherein the statistic is computed by the central computing device.

23. The method of claim 13, wherein communicating the other portions of the computed information is such that no two of the other portions of the computed information are communicated to a same one of the additional grid-computing devices.

24. The method of claim 23, wherein, with respect to each of the other portions of the computed information, the addressing scheme identifies a particular one of the additional grid-computing devices as a destination.

25. A grid-computing device comprising a processor, the processor configured to:
access a first subset of a set of observations at a grid-computing device being operated in a grid-computing system that includes multiple additional grid-computing devices configured to access additional subsets of the set;
compute hash values by using a hash function to hash observations in the first subset;
generate associations by associating the hash values with the additional grid-computing devices;
compute information about observations in the first subset;
designate a first portion of the computed information to be retained at the grid-computing device and designate other portions of the computed information to be communicated to the additional grid-computing devices, wherein designating the first portion of the computed information and designating the other portions of the computed information is done using an addressing scheme that is based on the associations;
retain the first portion of the computed information at the grid-computing device;
communicate the other portions of the computed information to the additional grid-computing devices;
receive additional information computed by the additional grid-computing devices, wherein the received additional information is about observations in the additional subsets;
generate a summary by aggregating the retained portion of the computed information and the received additional information; and
communicate the generated summary to another computing device configured to use the generated summary to compute a statistic that provides statistical information about the observations in the set.

26. The grid-computing device of claim 25, wherein the statistic is a top-k statistic that indicates distinct observations that are more prevalent in the set than other distinct observations not indicated by the statistic.

27. The grid-computing device of claim 26, wherein the processor is further configured to:
use an inventory process to compute the statistical information about the observations in the first subset.

28. The grid-computing device of claim 27, wherein the inventory process includes inventorying during multiple processing phases.

29. The grid-computing device of claim 28, wherein inventorying during multiple processing phases includes:
computing additional hash values; and using the additional hash values to determine assignments of observations to processing phases.

30. The grid-computing device of claim 25, wherein a range of the hash function consists of a number (n) of integers, and wherein the additional grid-computing devices consist of n−1 grid-computing devices.

31. The grid-computing device of claim 30, wherein the processor is further configured to use the hash function to hash observations by performing a modular operation in which n is a modulus.

32. The grid-computing device of claim 31, wherein the observations in the set include multiple non-integer observations, and wherein the processor is further configured to use the hash function to hash observations by further converting non-integer observations to integers.

33. The grid-computing device of claim 32, wherein each of the additional grid-computing devices is further configured to compute a summary of a subset of the set by processing at least one of the other portions of the computed information, and wherein computing the statistic includes aggregating summaries computed by the additional grid-computing devices.

34. The grid-computing device of claim 33, wherein the processor is further configured to communicate the generated summary to a central computing device in the grid-computing system, and wherein the central computing device is configured to compute the statistic.

35. The grid-computing device of claim 25, wherein communicating the other portions of the computed information is such that no two of the other portions of the computed information are communicated to a same one of the additional grid-computing devices.

36. The grid-computing device of claim 35, wherein, with respect to each of the other portions of the computed information, the addressing scheme identifies a particular one of the additional grid-computing devices as a destination.

* * * * *